(12) United States Patent
Cala' Lesina et al.

(10) Patent No.: US 12,044,912 B2
(45) Date of Patent: Jul. 23, 2024

(54) APPARATUS FOR PLASMONIC NANOANTENNA OPTICAL BEAM PHASE-SHIFTER AND STEERER

(71) Applicants: Antonino Cala' Lesina, Ottawa (CA); Pierre Simon Joseph Berini, Orleans (CA); Lora Ramunno, Ottawa (CA); Dominic John Goodwill, Ottawa (CA); Eric Bernier, Kanata (CA)

(72) Inventors: Antonino Cala' Lesina, Ottawa (CA); Pierre Simon Joseph Berini, Orleans (CA); Lora Ramunno, Ottawa (CA); Dominic John Goodwill, Ottawa (CA); Eric Bernier, Kanata (CA)

(73) Assignees: HUAWEI TECHNOLOGIES CANADA CO., LTD., Kanata (CA); THE UNIVERSITY OF OTTAWA, Ottawa (CA)

( * ) Notice: Subject to any disclaimer, the term of this patent is extended or adjusted under 35 U.S.C. 154(b) by 635 days.

(21) Appl. No.: 17/101,114

(22) Filed: Nov. 23, 2020

(65) Prior Publication Data

US 2021/0157179 A1 May 27, 2021

Related U.S. Application Data

(60) Provisional application No. 62/940,085, filed on Nov. 25, 2019.

(51) Int. Cl.
*G02F 1/055* (2006.01)
*G01S 7/481* (2006.01)
(Continued)

(52) U.S. Cl.
CPC ............ *G02F 1/0556* (2013.01); *G01S 7/481* (2013.01); *G02B 5/008* (2013.01); *G02B 6/1226* (2013.01);
(Continued)

(58) Field of Classification Search
CPC .... G02F 2203/15; G02F 1/292; G02F 1/0551; G02F 1/0556; G02B 5/008; G02B 6/1226; G02B 27/0087
See application file for complete search history.

(56) References Cited

U.S. PATENT DOCUMENTS 5,793,907 A    8/1998   Jalali et al.
6,442,308 B1   8/2002   Han et al.
(Continued)

FOREIGN PATENT DOCUMENTS

CN      105527772 A    4/2016
CN      108469651 A    8/2018
(Continued)

OTHER PUBLICATIONS

Lesina et al., "Optical phased arrays for LIDAR: beam steering via tunable plasmonic metasurfaces." Oct. 24, 2019, pp. 1-19.
(Continued)

*Primary Examiner* — Christopher Stanford
*Assistant Examiner* — Journey F Sumlar

(57) ABSTRACT

A pixel for creating an optical phase change includes a transparent electrical insulator, a first electrical conductor disposed on the transparent electrical insulator, the first electrical conductor comprising an antenna component and a connector component, an electrical insulator disposed on the first electrical conductor, a transparent semiconductor disposed on the electrical insulator, and a second electrical conductor disposed on the transparent semiconductor. The transparent semiconductor is sufficiently thick to prevent plasmonic resonance from occurring at an interface between the transparent semiconductor and the second electrical conductor.

17 Claims, 18 Drawing Sheets

(51) Int. Cl.
G02B 5/00 (2006.01)
G02B 6/122 (2006.01)
G02B 27/00 (2006.01)
G02F 1/29 (2006.01)
G01S 13/02 (2006.01)

(52) U.S. Cl.
CPC ....... *G02B 27/0087* (2013.01); *G02F 1/0551* (2013.01); *G02F 1/292* (2013.01); *G01S 2013/0245* (2013.01); *G01S 2013/0254* (2013.01); *G02F 2203/10* (2013.01); *G02F 2203/15* (2013.01); *G02F 2203/24* (2013.01); *G02F 2203/50* (2013.01); *G02F 2203/58* (2013.01)

(56) References Cited

U.S. PATENT DOCUMENTS

| | | | |
|---|---|---|---|
| 9,864,109 | B2* | 1/2018 | Lee ................. G02B 6/1226 |
| 11,249,371 | B2 | 2/2022 | Bogaerts |
| 2002/0131704 | A1 | 9/2002 | Doerr |
| 2005/0248829 | A1* | 11/2005 | Sawin .................. B82Y 20/00 |
| | | | 359/321 |
| 2016/0223723 | A1* | 8/2016 | Han ....................... G02F 1/292 |
| 2017/0184881 | A1* | 6/2017 | Loertscher .............. G02F 1/015 |
| 2018/0059505 | A1 | 3/2018 | Kyoung et al. |
| 2018/0136542 | A1 | 5/2018 | Kim et al. |
| 2018/0149943 | A9* | 5/2018 | Puscasu ................. H01Q 1/425 |
| 2018/0366824 | A1* | 12/2018 | Shim ....................... H01Q 3/08 |
| 2019/0033682 | A1 | 1/2019 | Kafaie Shirmanesh et al. |
| 2019/0227350 | A1* | 7/2019 | Puckett ................ H04B 10/548 |

FOREIGN PATENT DOCUMENTS

| | | |
|---|---|---|
| CN | 110082906 A | 8/2019 |
| EP | 3428695 A1 | 1/2019 |
| WO | 2016187826 A1 | 12/2016 |

OTHER PUBLICATIONS

Surface Plasmon, Wikipedia, Nov. 20, 2019, https://en.wikipedia.org/wiki/Surface_plasmon.

Dionne et al., "Highly confined photon transport in subwavelength metallic slot waveguides." Nano Lett. 6, 1928-1932 (2006).

Huang et al., "Gate-Tunable Conducting Oxide Metasurfaces." Nano Lett. Aug. 26, 2016, 16(9), pp. 5319-5325.

Shirmanesh et al., "Dual-Gated Active Metasurface at 1550 nm with Wide (>300°) Phase Tunability." Nano Lett. Mar. 23, 2018, 18(5), 2957-2963.

Forouzmand et al., "Real-Time Controllable and Multifunctional Metasurfaces Utilizing Indium Tin Oxide Materials: A Phased Array Perspective." IEEE Transactions on Nanotechnology, vol. 16, No. 2, Mar. 2017, pp. 296-306.

Li, Y., & Ibanez-Guzman, J. (2020) "Lidar for autonomous driving: The principles, challenges, and trends for automotive lidar and perception systems", IEEE Signal Processing Magazine, 37(4), 50-61.

Van Acoleyen et al., "Two-Dimensional Dispersive Off-Chip Beam Scanner Fabricated on Silicon-On-Insulator", IEEE Photonics Technology Letters, vol. 23(17), 1270-1272, Sep. 1, 2011.

Bogaerts et al., Dispersive optical phased array circuit for high-resolution pixelated 2D far-field scanning controlled by a single wavelength variable, Proc. SPIE, Feb. 26, 2020.

Lopez et al., "MIT Spinoff Building New Solid-State Lidar-on-a-Chip System", IEEE Spectrum, Dec. 1, 2020.

Smit et al., "PHASAR-Based WDM-Devices: Principles, Design and Applications", IEEE Journal of Selected Topics in Quantum Electronics, vol. 2(2), Jun. 1996.

Trinh et al., "5 X 9 Integrated Optical Star Coupler in Silicon-on-Insulator Technology" IEEE Photonics Technology Letters, vol. 8(6), Jun. 1996.

Zou et al., "Performance Improvement for silicon-based arrayed waveguide grating router", Optices Express, vol. 25(9), May 1, 2017.

Tran, M. A., et al., "Tutorial on narrow linewidth tunable semiconductor lasers using Si/III-V heterogeneous integration", APL Photonics, 4(11), 111101, 2019.

Boller, K. J., et al., (Dec. 2019) "Hybrid integrated semiconductor lasers with silicon nitride feedback circuits", Photonics 2020, 7(4), 33 pages.

Zhu, Y., Zeng, et al., "Optical beam steering by using tunable, narrow-linewidth butt-coupled hybrid lasers in a silicon nitride photonics platform", Photonics Research, 8(3), 375-380, Mar. 2020.

Xiang, Chao, et al.,. "Ultra-narrow linewidth laser based on a semiconductor gain chip and extended Si3N4 Bragg grating," Opt. Lett. 44, 3825-3828 (2019).

Xiang, Chao, et al., "Narrow-linewidth III-V/Si/Si3N4 laser using multilayer heterogeneous integration," Optica 7, 20-21 (2020).

Fan, Youwen et al., "Hybrid integrated InP—Si3N4 diode laser with a 40-Hz intrinsic linewidth," Opt. Express, 28(15), 21713-21728 (2020).

Van Rees, Albert, et al., "Ring resonator enhanced mode-hop-free wavelength tuning of an integrated extended-cavity laser," Opt. Express, 28(4), 5669-5683 (2020).

Tran, M. A., et al., "Ring-Resonator Based Widely-Tunable Narrow-Linewidth Si/InP Integrated Lasers," IEEE Journal of Selected Topics in Quantum Electronics, vol. 26, No. 2, pp. 1-14, Mar.-Apr. 2020.

* cited by examiner

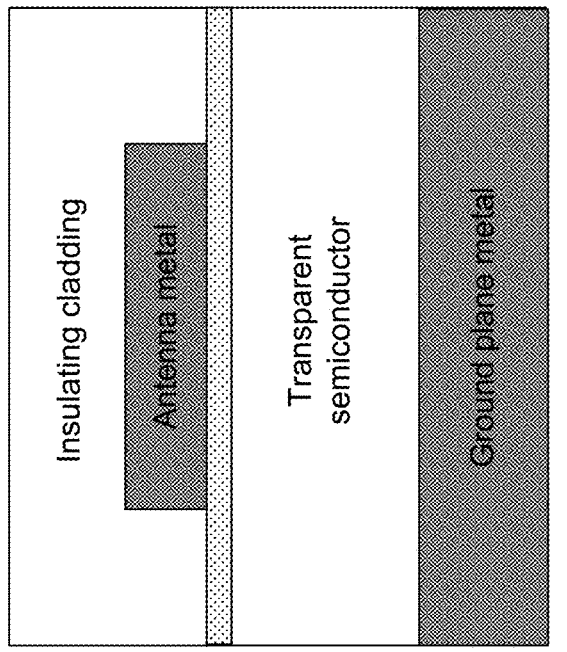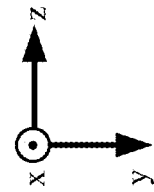
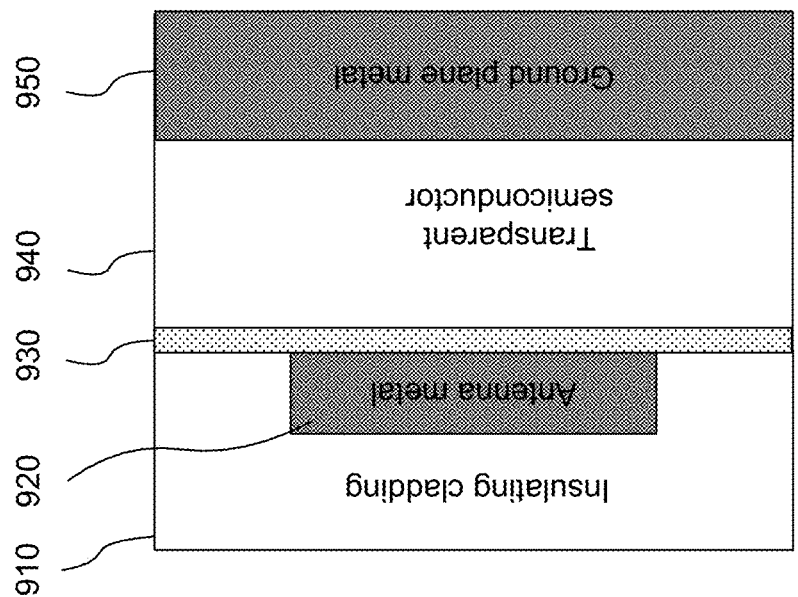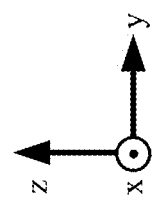
Figure 9

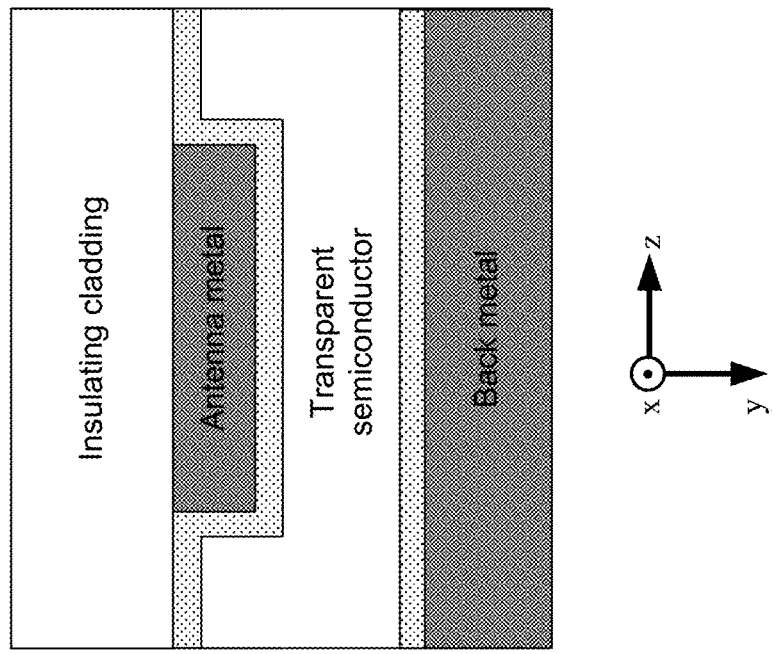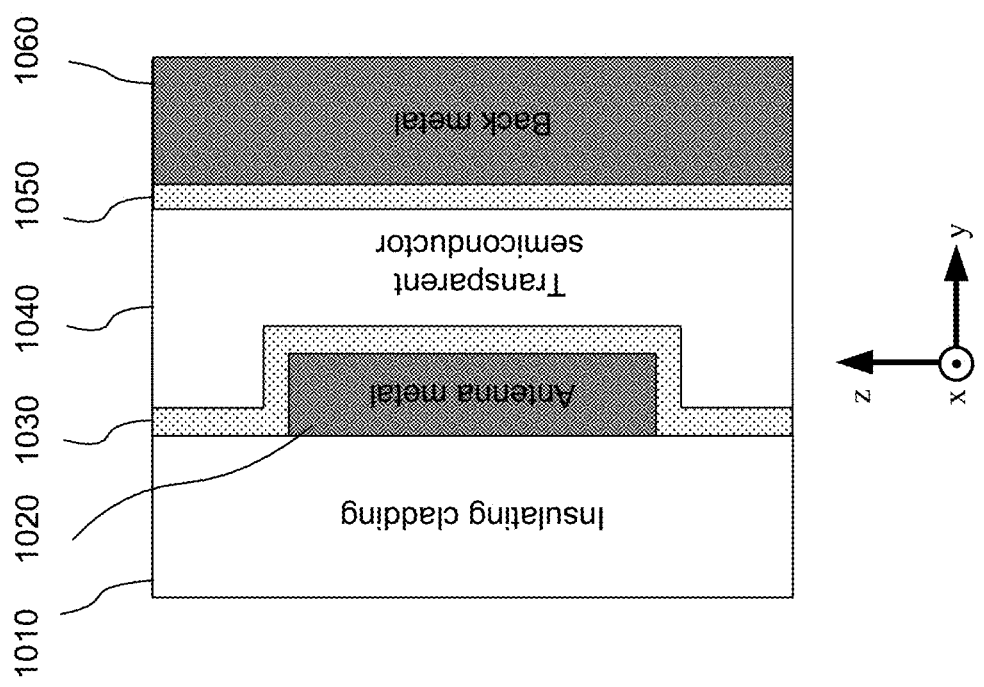
Figure 10

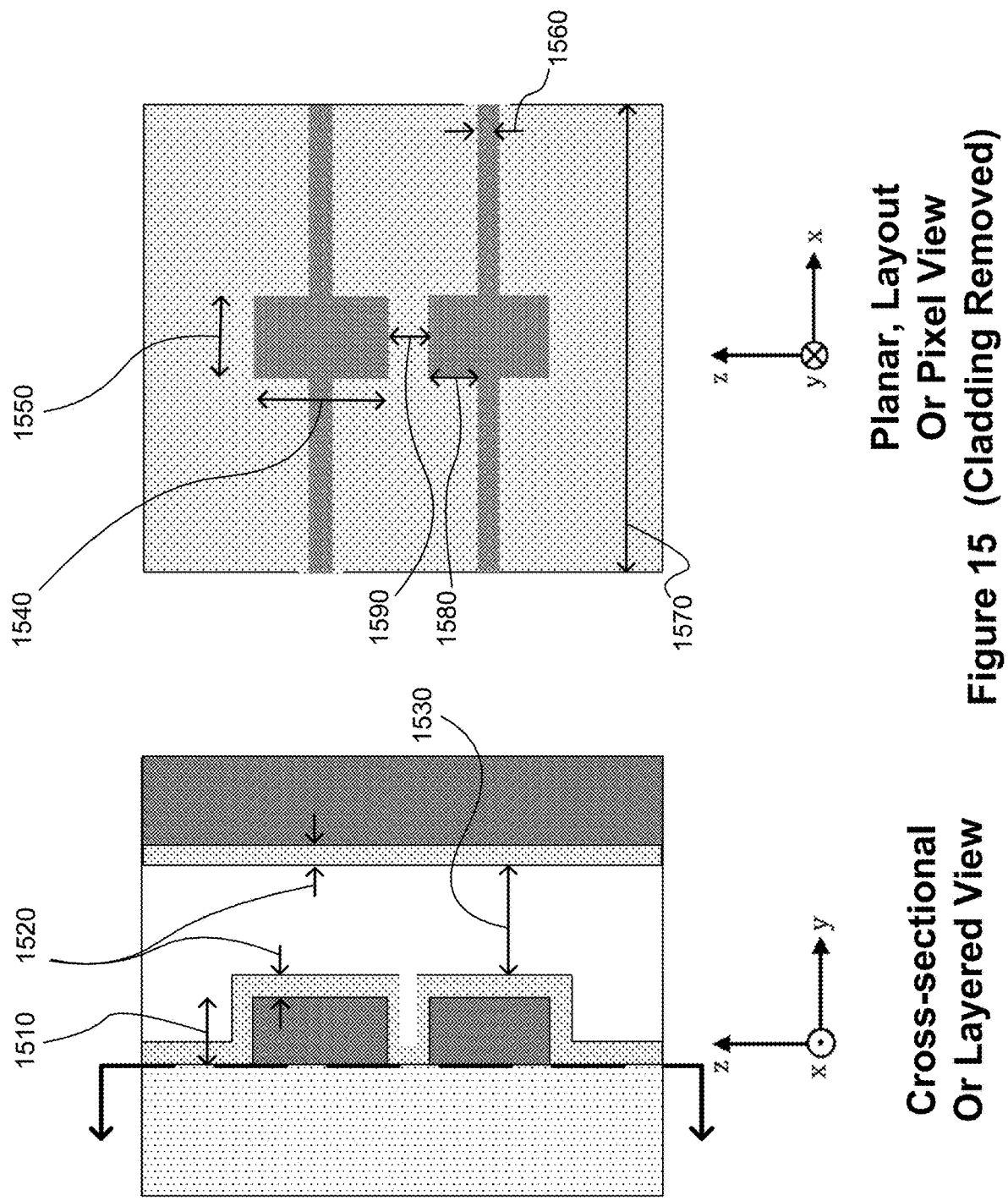
Figure 15 (Cladding Removed)

APPARATUS FOR PLASMONIC NANOANTENNA OPTICAL BEAM PHASE-SHIFTER AND STEERER

CROSS-REFERENCE TO RELATED APPLICATIONS

This application claims the benefit of priority to U.S. patent application Ser. No. 62/940,085 entitled "METHOD AND APPARATUS FOR PLASMONIC NANOANTENNA OPTICAL BEAM PHASE-SHIFTER AND STEERER" filed Nov. 25, 2019, which is hereby incorporated by reference in its entirety.

FIELD OF THE INVENTION

This invention pertains generally to optical and photonic devices and in particular, to a nanoscale material structure that can be used to shift the phase of a beam of optical radiation.

BACKGROUND OF THE INVENTION

Vehicles such as self-driving cars need improved sensors to detect their environment. Lidar is a potential sensor technology for this market, but a challenging problem using lidar for the automotive market is to steer an optical beam in a controlled direction away from the transmitter or to steer the beam's capture direction in the receiver (i.e. the direction where the receiver "looks"). Some implementations use mechanical moving parts, but these are bulky and may be unreliable in the rugged mechanical and thermal environment of vehicles. Accordingly, there is motivation for a solid-state optical beam steerer that has no moving parts.

A phased array is a beam-reflecting surface composed of pixels, each of which can apply a phase shift to beam of electromagnetic radiation. If the size of a pixel is much smaller than the wavelength of the beam, the array can have a large steering angle without creating multiple aliased beams. An additional requirement for a phased array is that the pixel should only change the phase of a beam, and not its amplitude. Changing the amplitude of a beam creates distortions of the transmitted or captured light, which reduce resolution of the steered beam and introduce stray light into the lidar. A lidar transmitter ideally should have a single beam, with very high contrast to stray light. Otherwise it cannot reliably illuminate and distinguish target objects in a scene.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The present invention relates to a nanoscale device that uses plasmonic resonance to shift the phase of an incident beam of optical radiation in accordance with an applied voltage, without significantly affecting the beam's amplitude. By combining a large number devices into an array and by applying a pattern of voltages to rows of the array, a beam of optical radiation can be steered as the different parts of the beam undergo different phase shifts, in a manner similar to a classic phased array.

Embodiments of the invention are directed towards a pixel that includes a transparent electrical insulator (which may be a substrate or may be air), a first electrical conductor disposed on the transparent electrical insulator, the first electrical conductor comprising an antenna component and a connector component, an electrical insulator disposed on the first electrical conductor, a transparent semiconductor disposed on the electrical insulator, and a second electrical conductor disposed on the transparent semiconductor. The transparent semiconductor is sufficiently thick to prevent plasmonic resonance from occurring at an interface between the transparent semiconductor and the second electrical conductor, upon excitation of a plasmonic resonance at the electrical insulator and its interfaces to the first electrical conductor and the transparent semiconductor.

In further embodiments, the transparent semiconductor is sufficiently thick to prevent any joint plasmonic resonance from occurring between two sets of interfaces, a first set of interfaces between the first electrical conductor, the electrical insulator and the transparent semiconductor; and a second set of interfaces between the transparent semiconductor and the second electrical conductor.

In further embodiments, the first electrical conductor, the electrical insulator and the transparent semiconductor can support a plasmonic resonance upon excitation by an incident optical beam.

In further embodiments, the first electrical conductor is partially or wholly embedded in the electrical insulator.

In further embodiments, the pixel includes a second electrical insulator between the transparent semiconductor and the second electrical conductor.

In further embodiments, the antenna component does not extend to the edge of the pixel and the electrical connector component intersects the antenna component and extends to an edge of the pixel to allow a connection external to the pixel.

In further embodiments, the antenna component includes two lines shorter than the length of the pixel separated by a gap, and short enough not to overlap any part of the neighbouring intersection. Each of the two lines is intersected by corresponding connector components that extend to the edge of the pixel to allow connections external to the pixel. The connector components extending on either side of an antenna may be shorted or connected to each other.

In further embodiments, the dimensions of the antenna component are selected for the pixel to operate with an optical beam having a wavelength in the visible and infrared range.

In further embodiments, the dimensions of the antenna component are selected to prevent significant interaction with an adjacent pixel.

In further embodiments, the transparent electrical insulator serves as a cladding for the remaining structure.

In further embodiments, the antenna component serves as an antenna for optical radiation, as well as a variable source of constant electrical potential.

In further embodiments, the electrical insulator is sufficiently thin to allow electrical fields from the antenna component to be perceived by the transparent semiconductor.

In further embodiments, the electrical insulator is sufficiently thin to allow a change in electric fields from the antenna component to cause a change in carrier density profile in the transparent semiconductor.

In further embodiments, the transparent semiconductor has a carrier density profile that is affected by fields of the antenna component, the fields comprising static fields and time-varying fields.

In further embodiments, the second electrical conductor serves as a ground plane.

In further embodiments, the antenna component, the electrical insulator, and the transparent semiconductor, sustain a plasmonic or electrical resonance when a beam of optical radiation is incident upon the structure.

In further embodiments, the resonance frequency of the plasmonic resonance can be altered by applying an electrical potential between the antenna component and the second electric conductor.

In further embodiments, a phase of an incident beam of optical radiation is shifted as it is transmitted or reflected at the resonance layers, the shift being affected by an electrical potential applied between the antenna component and the second electric conductor.

In further embodiments, a phase shift of a reflected or transmitted beam of optical radiation is affected by an electrical potential applied between the antenna component and the second electric conductor.

In further embodiments, the resonance of the structure is split into a pair of resonances, wherein a first resonance is induced by an electrical-optical interaction primarily in the gap between the two lines of the antenna, and a secondary resonance can be induced primarily by an electrical-optical interaction between the connector components.

In further embodiments, the resonance of the structure is split into a pair of resonances, having different wavelengths, by a degeneracy-breaking interaction between the antenna and the connectors, wherein a first resonance is induced by an electrical-optical interaction primarily in the gap between the two lines of the antenna, and a secondary resonance can be induced primarily by an electrical-optical interaction between the connector components In further embodiments, a pixel can have a first resonance induced by an electro-optical interaction primarily in the gap between the two lines of the antenna, and can have a secondary resonance induced by an electrical-optical interaction between the connector components.

In further embodiments, the first and second resonances can be at different wavelengths, and the magnitude of reflectance or transmittance of a beam of optical radiation having a wavelength between the first and second resonances is not significantly affected by an electrical potential applied between the antenna component and the second electric conductor.

In further embodiments, the reflectance or transmittance of a beam of optical radiation is not significantly affected by an electrical potential applied between the antenna component and the second electric conductor.

In further embodiments, the resonance of the structure is split into a pair of resonances, having different wavelengths, by a degeneracy-breaking interaction between the antenna and the connectors.

In further embodiments, the relative strength, wavelength and spectral width of the resonances may be such that there is an optical spectral region wherein the magnitude of the optical reflection is essentially constant.

In further embodiments, the relative strength, wavelength and spectral width of the resonances may be such that the magnitude of reflectance or transmittance of a beam of optical radiation having a wavelength between the first and second resonances is not significantly affected by an electrical potential applied between the antenna component and the second electric conductor.

In further embodiments, the relative strength, wavelength and spectral width of the resonances may be such that there is an optical spectral region wherein an electrical potential applied between the antenna component and the second electric conductor significantly affects the phase of reflectance or transmittance of a beam of optical radiation but not the magnitude of reflectance or transmittance of a beam of optical radiation.

In further embodiments, the second electrical conductor is sufficiently thin to be transparent to a range of optical wavelengths.

In further embodiments, the second electrical conductor is omitted and the transparent semiconductor serves as a ground plane.

In further embodiments, the thicknesses, widths and lengths of the materials are selected to result in a reflectance spectrum in which the reflectance magnitude for at least one wavelength of optical radiation, is similar for any carrier density of the transparent semiconductor, in a range of carrier densities corresponding to an at least 90-degree-wide range of phase shifts, for the at least one wavelength of optical radiation.

Other embodiments are directed towards a pixel array including a plurality of pixels arranged in a plurality of rows. Each of the plurality of pixels in each of the plurality of rows is connected in series. Each of the plurality of pixels includes a transparent electrical insulator, a first electrical conductor disposed on the transparent electrical insulator, the first electrical conductor comprising an antenna component and a connector component, an electrical insulator disposed on the first electrical conductor, a transparent semiconductor disposed on the electrical insulator, and a second electrical conductor disposed on the transparent semiconductor. The transparent semiconductor is sufficiently thick to prevent plasmonic resonance that is primarily located in the vicinity of the electrical insulator from having a significant strength at an interface between the transparent semiconductor and the second electrical conductor.

In further embodiments, each of the plurality of rows is independent of each other. Each of the plurality of rows is capable of having a different potential applied to allow the application of electric potential patterns to steer a beam of optical radiation incident on the array without significantly altering its amplitude profile.

In further embodiments, the dimensions of the antenna component are selected to prevent significant diffraction or side lobes from an interacting beam of optical radiation.

BRIEF DESCRIPTION OF THE DRAWINGS

FIG. 9 illustrates the cross-sectional configuration of a single pixel according to another embodiment.

FIG. 10 illustrates the cross-sectional configuration of a single pixel according to another embodiment.

FIG. 15 illustrates geometric parameters of a pixel along its thickness and surface area.

DETAILED DESCRIPTION OF THE INVENTION

It is known that when a beam of light is incident upon a mirror, the beam is reflected at an angle from the mirror's perpendicular that is identical to that of the incident beam's angle. To redirect an incident beam towards a different angle, a mechanical rotation of the mirror is generally required.

Embodiments of the present invention relate to an electro-optical device that can be electronically tuned to steer or redirect an incident beam of optical radiation in an outgoing direction having an angle from the device's surface that can differ from the incident beam's angle, without the need for mechanical intervention.

Embodiments of the present invention having the ability to redirect a beam of optical radiation operate as a phased array, comprising an array of pixels each having the ability to shift the phase of an optical beam in response to applied electrical potentials.

In some embodiments of the present invention, the device can reflect an optical beam in an electrically-tuned direction and may therefore be considered an active mirror, while in other embodiments it can transmit the beam in an electrically-tuned direction instead and may therefore be considered an active phase plate.

Figure 1:
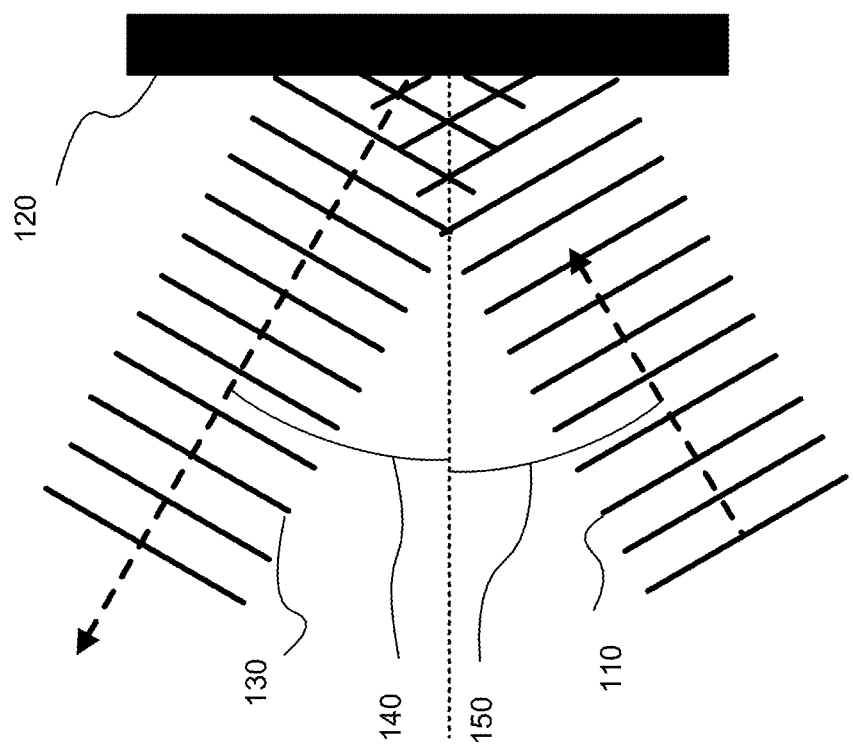
FIG. 1 illustrates reflection of a beam of optical radiation from a passive or active mirror.

FIG. 1 illustrates an embodiment of the present invention where a beam of light 110 is incident upon a mirror 120, and the outgoing beam 130 is reflected at an angle 140 from the surface's perpendicular which is electronically tuned to be the same as the angle 150 of the incident beam, such as to mimic a common passive mirror.

Figure 2:
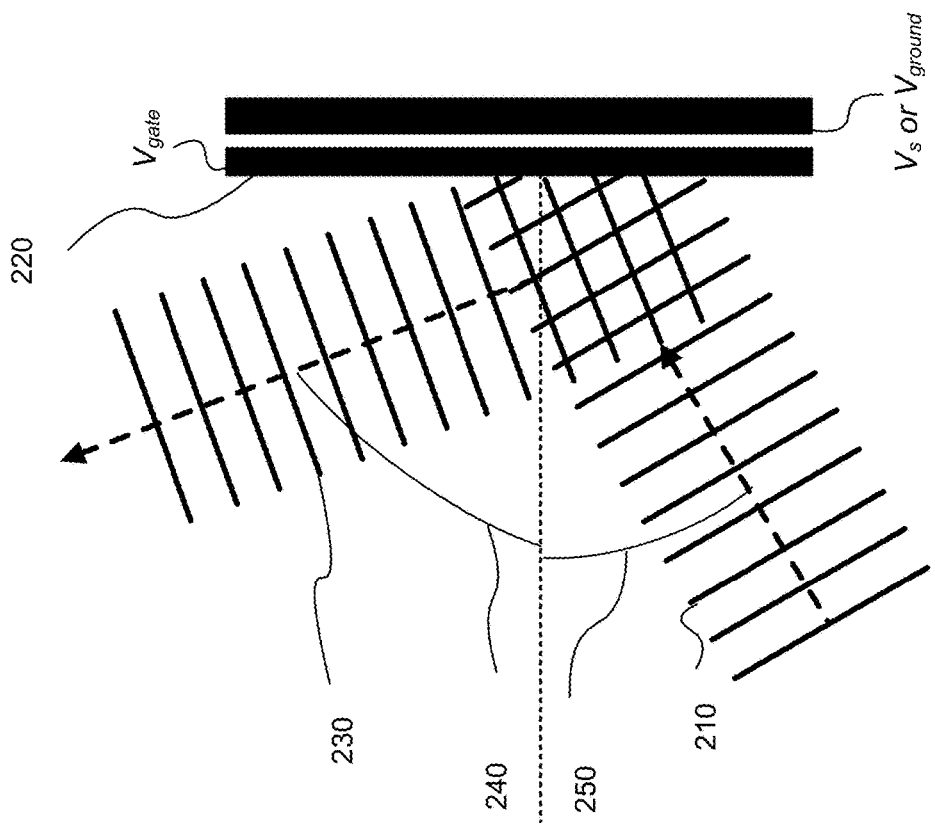
FIG. 2 illustrates reflection of optical radiation from an active mirror according to an embodiment.

FIG. 2 illustrates an embodiment of the present invention where a beam of light 210 is incident upon a mirror 220, and the outgoing beam 230 is reflected at an angle 240 from the surface's perpendicular which can be electronically tuned to be different from the angle 250 of the incident beam. Solid lines laterally across beams 110, 130, 210, 230 correspond to optical phase fronts, while dashed arrows indicates the direction of propagation of the beam.

Embodiments of the present invention include a surface comprising an array of reflective pixels, scaled for optical wavelengths, upon which an optical beam is incident. Each pixel can apply a phase shift to the part of the beam with which it interacts, such that the beam is reflected in a direction that depends on the pattern of phase shifts applied to the beam.

Although, some optical phase change pixels can operate using plasmonic resonance in metal-insulator-metal (MIM) structure, such MIM pixels have a resonance which is a combined mode of a nanoantenna and a ground plane, and they may require two voltage controls. While the phase shift of light exiting such a pixel can be tuned by controlling the applied voltages, this also introduces a change in the amplitude of the light. Modulation of both the amplitude and the phase is therefore not independent, such that if MIM pixels were arranged in an MIM array and a beam steering pattern of phase shifts is applied to the MIM array, the beam will not only be steered, but its amplitude profile will be modified as well. For some applications, a device able to steer an optical beam without introducing any amplitude modulation is desirable.

Figure 3:
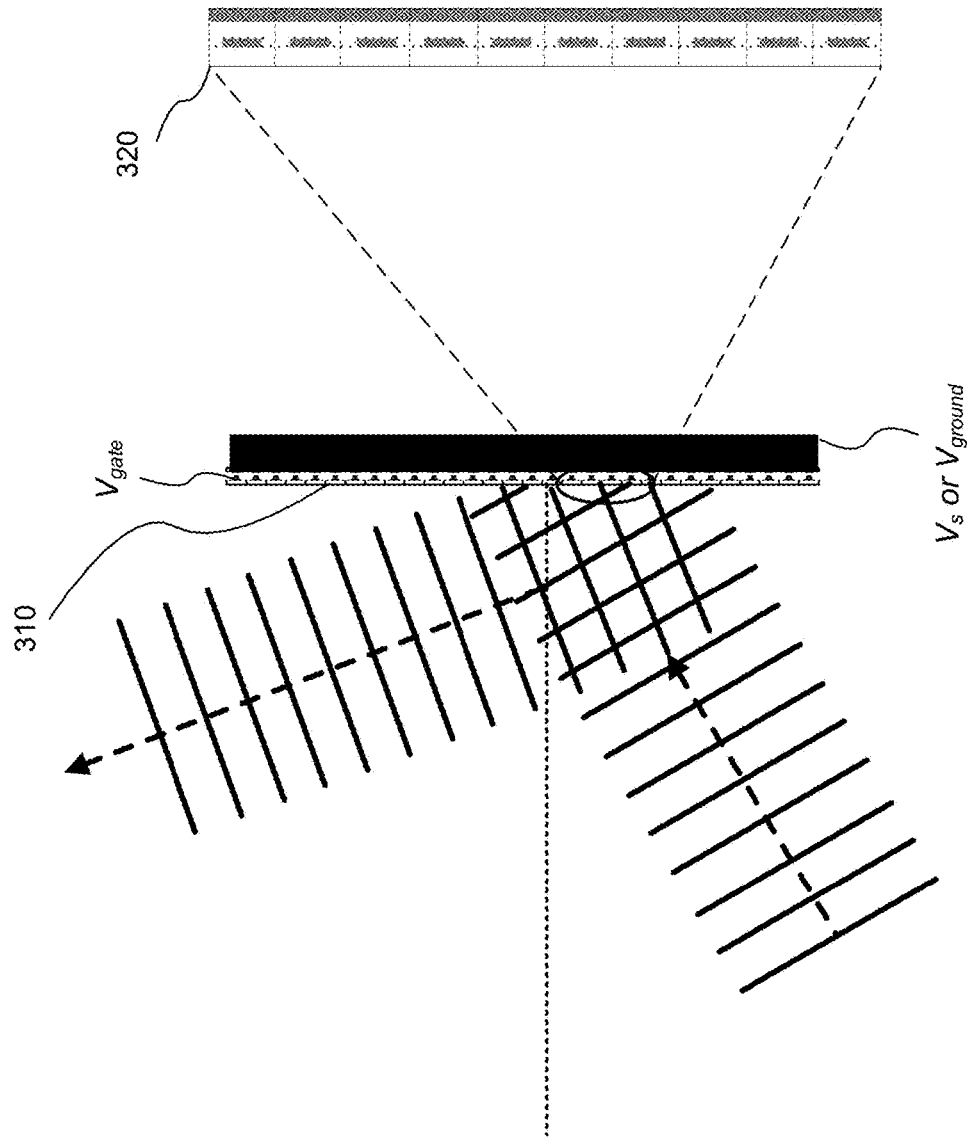
FIG. 3 illustrates a close-up of an active mirror surface made up of an array of active pixels.

FIG. 3 illustrates an embodiment of the present invention where a surface comprises an array of pixels 310 each of which can apply a phase shift to an incident beam, such that the beam as a whole is redirected in accordance with the pattern of phase shifts applied by the pixels to the beam. The array of pixels 310 is illustrated in cross-section. An arbitrarily sized close-up of a column of pixels 320 is shown in cross-section on the right.

In embodiments of the present invention, the pixels forming the array are electronically connected along one direction of the array, but independent along the other, such that the same electrical potential applies to all of the pixels along a same row, but the potential for each row is independent from one another. For pixels able to shift the phase of a beam, an arrangement of this nature is known as a phased array. It may also be known more specifically as a 1-dimensional phased array as it can steer the angle of the reflected beam about 1 axis only.

Figure 4:
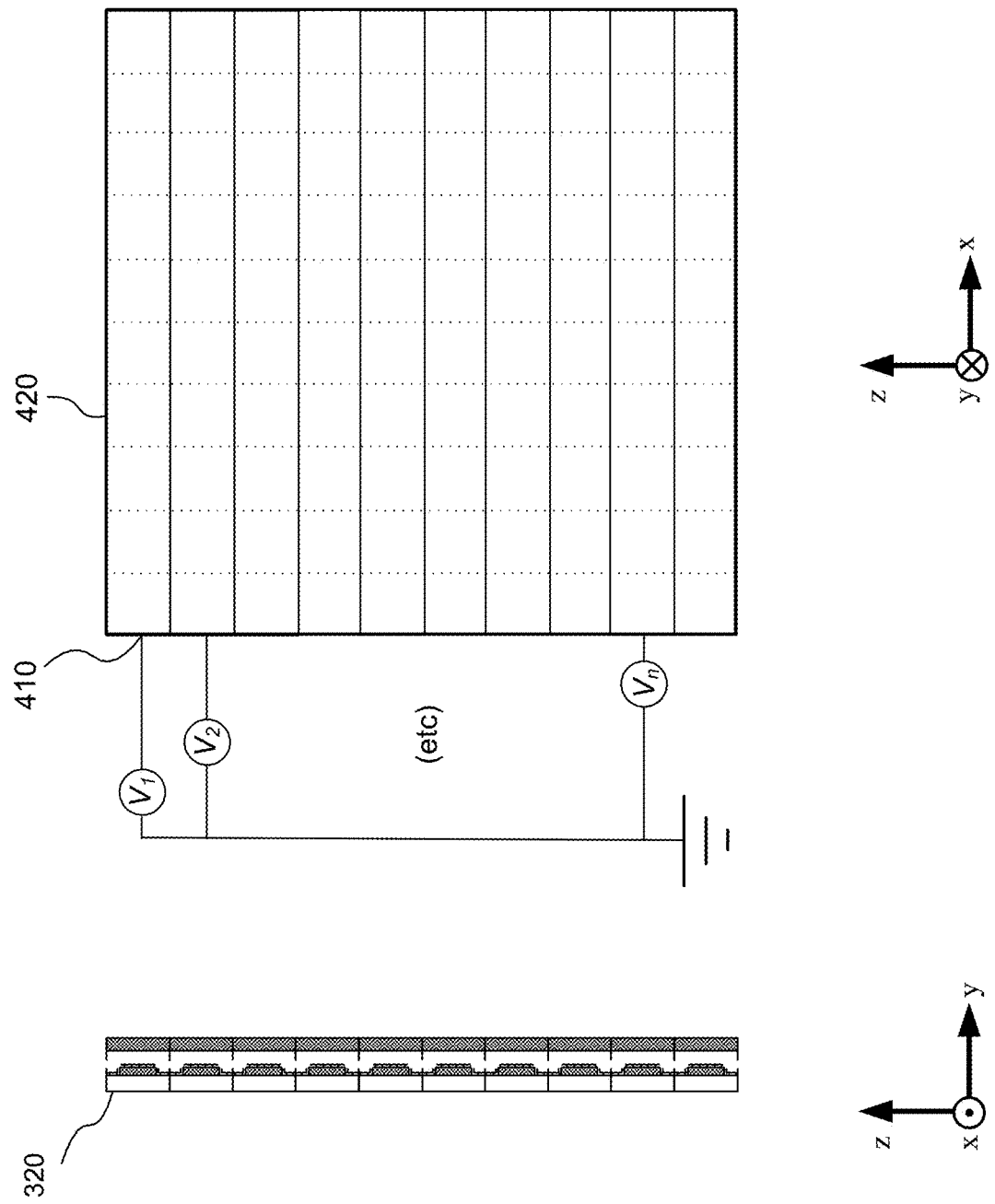
FIG. 4 illustrates an active mirror surface made up of an array of active pixel rows.

FIG. 4 illustrates an embodiment of the present invention wherein the pixels along a row 410 of the x-axis are connected to each other and to a common potential, but the columns of pixels 420 along the z-axis are not connected to each other, such that the potential for each row can be controlled independently. The potential on each row 410 may have positive or negative polarity with respect to ground, or all potentials may have the same polarity. Each potential is varied in time or electrically tuned to achieve beam-steering. The ground illustrated in FIG. 4 may be at an absolute ground potential or may be offset by a DC voltage. In this embodiment, an optical beam incident upon the array of pixels can be steered with an electrically tuned angle of rotation about the x-axis.

In embodiments of the present invention, each pixel can have a structure of layered materials, each having certain electrical conduction properties. The array as a whole can comprise a layered structure of materials, structured such as to contain independent pixels. The independence of pixels from each other can be obtained by ensuring that the distance between them, known as the pitch, is sufficient for their electromagnetic influence to be negligible where a neighbouring pixel is located, aside from that of a voltage connector. Each pixel contains an antenna, and the size of the pixel is comparable to the effective aperture of the antenna. As is known from antenna theory, the effective aperture of an antenna is typically larger than the physical extent of the antenna. The effective aperture of an antenna represents the area over which the antenna exerts significant electromagnetic influence. Accordingly, in embodiments of the invention, the antenna within each pixel is smaller than the overall area of the pixel.

In embodiments of the present invention, each pixel can have a structure that can apply a phase shift to an incident beam of optical radiation, in response to an applied voltage potential.

Figure 5:
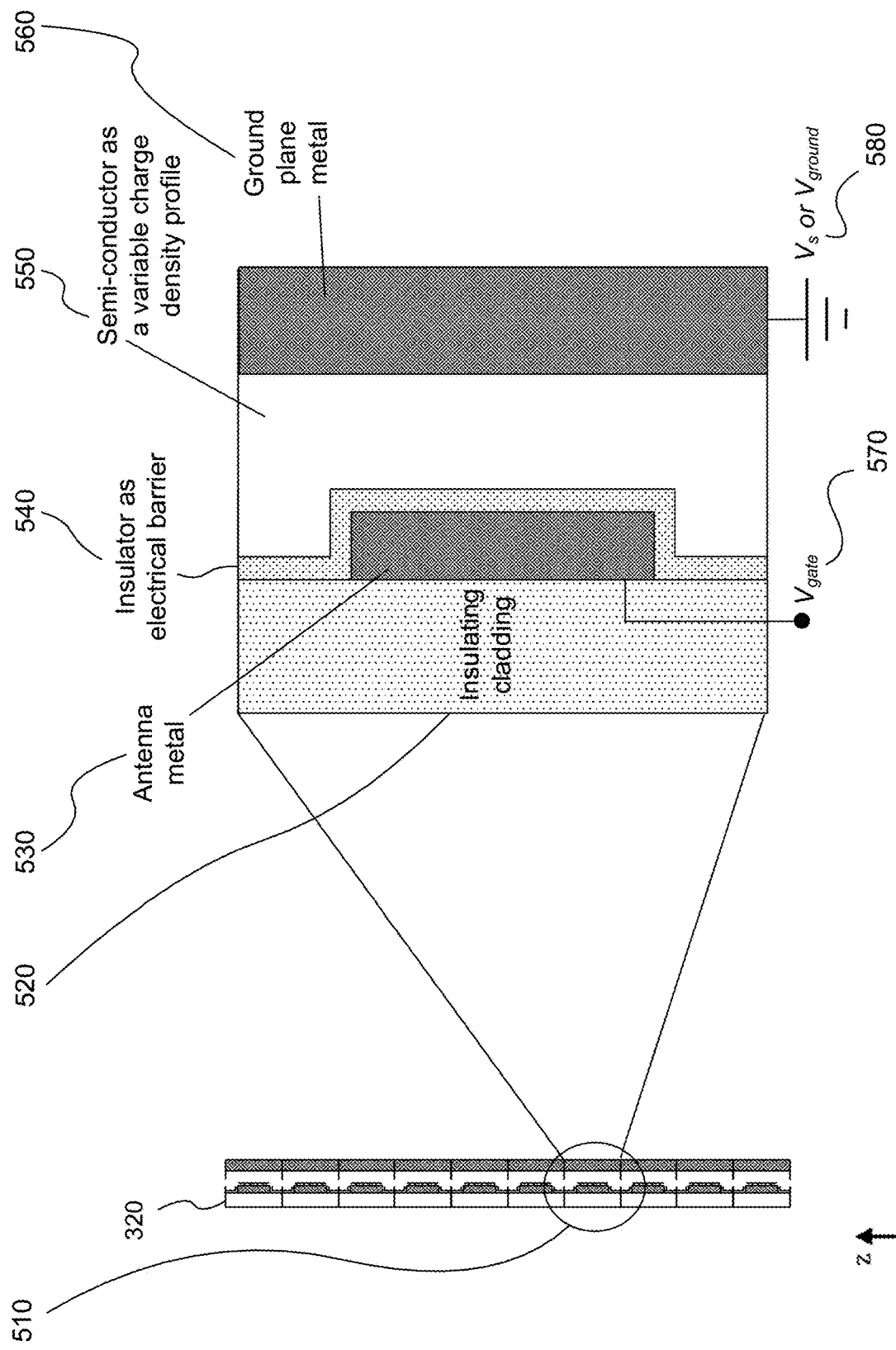
FIG. 5 illustrates a close-up of a single pixel's cross-section.

FIG. 5 illustrates an embodiment of the present invention wherein a pixel 510 comprises a structure able to shift the phase of an incident beam of optical radiation. The first layer encountered by the beam is an insulating cladding 520 that protects the internal layers, but is transparent to the incident beam. The insulating cladding 520 may alternatively be air, which is transparent and serves as an insulator but does not serve as a protective layer. The second layer is a metal 530 that serves as an antenna to intercept part of the optical beam, and as an electric field source to modify the charge density profile of the semiconductor at the fourth layer 550. The word "metal" in this specification has the definition as used by semiconductor device manufacturers, which comprises classical metals and alloys (for example gold, aluminum, copper, silver, titanium and their alloys) and compounds that have metallic behaviour (for example titanium nitride, tantalum nitride and like compounds, also known as barrier metals). The third layer is an insulator 540 that serves as a barrier to maintain the electric field that tunes the semiconductor's charge density profile. Insulator 540 may be oxide-based, but other suitable materials may also be used. The fourth layer is a semiconductor 550 whose charge carrier density profile can be modulated in accordance with applied electric fields from the antenna metal, and that can perceive electrical or plasmonic resonance in the antenna 530. The semiconductor 550 may be optically transparent to the optical beam. The fifth layer is a metal serving as a ground plane 560 to sustain the applied voltage and that also protects the structure. The aforementioned field arises from a gate voltage 570 applied between the antenna metal 530 and a ground plane metal 560. The ground plane metal 560 is connected to an electrical ground 580.

The following illustrates an embodiment of the present invention where the materials in FIG. 5 are identified, along with possible dimensions along the y-axis:

- The first layer 520 may be silicon oxide ($SiO_2$), thick enough to serve as a transparent insulating cladding over the entire face of the structure.
- The second layer 530 may be 50 nm thick gold (Au), serving as an antenna and connector to other pixels or a field source.
- The third layer 540 may be 5 nm thick aluminum oxide ($Al_2O_3$), hafnium dioxide ($HfO_2$), hafnium aluminum oxide, a nitride or an oxynitride, serving as an electrical barrier. The barrier is thin enough for electrical fields to be perceived by the fourth layer, and also transparent or thin enough to be transparent.
- The fourth layer 550 may be 100 nm thick indium tin oxide (ITO) or aluminum-doped zinc oxide (AZO), serving as a transparent semiconductor that is sufficiently thick not to be plasmonically coupled to the ground plane conductor when it is coupled to the antenna conductor.
- The fifth layer 560 may be gold (Au), thick enough to serve as a reflector and electrical ground.

In embodiments of the present invention, each pixel comprises a structure wherein the antenna metal is a single branch along the z-axis, placed across the connector.

Figure 6:
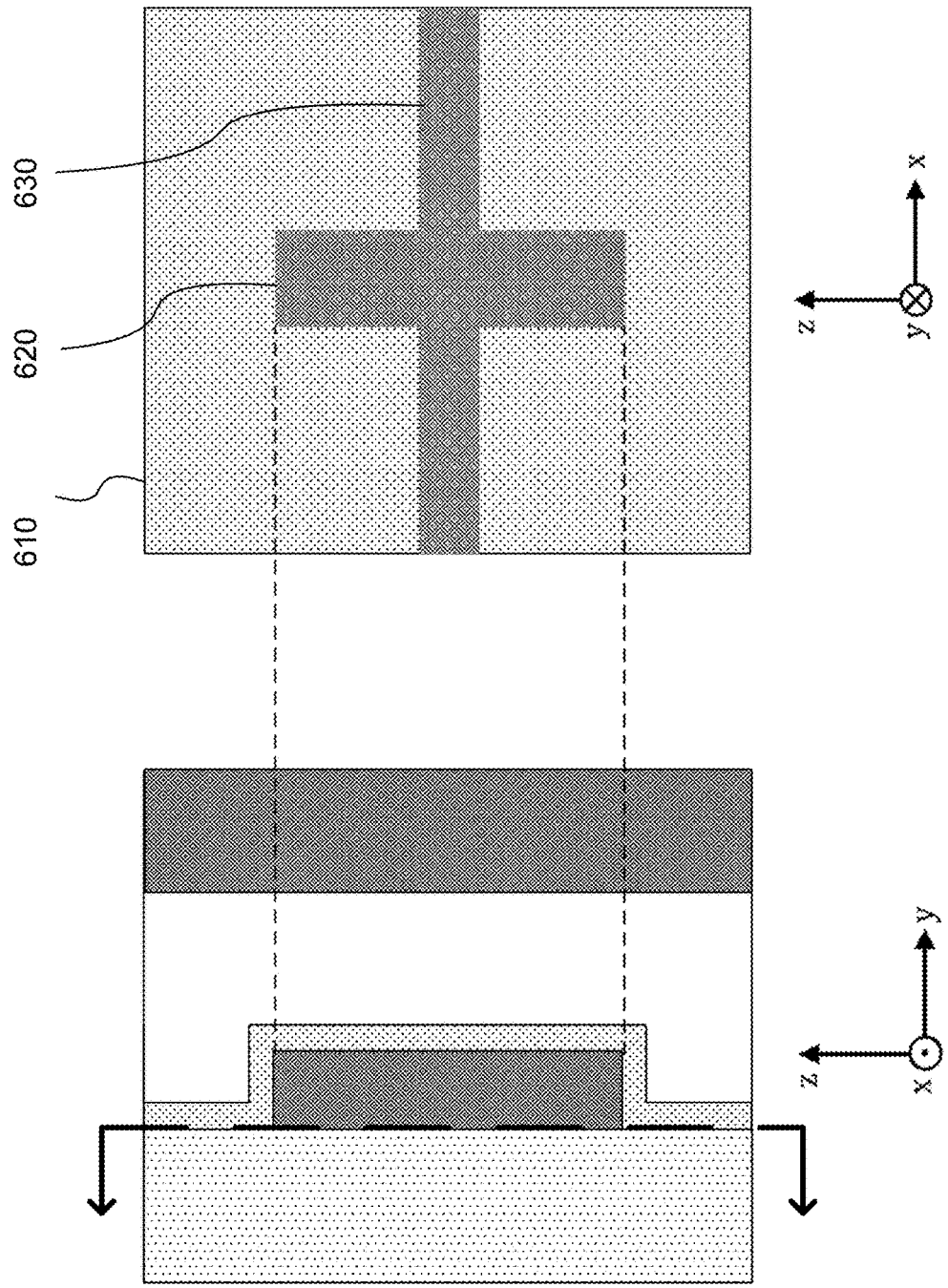
FIG. 6 illustrates an embodiment for a single pixel having a single-branch antenna.

FIG. 6 illustrates an embodiment of the present invention wherein a pixel 610 comprises a single branch of antenna metal 620, across a single connector 630. The dimensions of the pixel structure can be chosen to be large enough that any effect of the antenna along the xz-plane is negligible beyond the boundaries of the pixel. The dimensions of the pixel structure can also be chosen to be small enough for any diffraction of the beam and grating lobes, caused by the dimensions of the pixel, to be negligible. A phased array composed of pixels of such small dimension is alias-free as it steers the output light primarily into a single beam without additional alias beams.

In embodiments of the present invention, each pixel can comprise a structure wherein the antenna metal is composed of two branches instead of one, and each branch is placed across a different connector, thereby forming a dipole antenna having a gap that creates strong electric field enhancements along the antenna axis. The width of the gap between the two branches can be chosen such as to adjust the functional properties of the pixel structure. In particular, reducing the width of the gap can increase the amplitude of the reflection coefficient of the pixel, while increasing the width of the gap can increase the range of phases of the reflection coefficient of the pixel.

Figure 7:
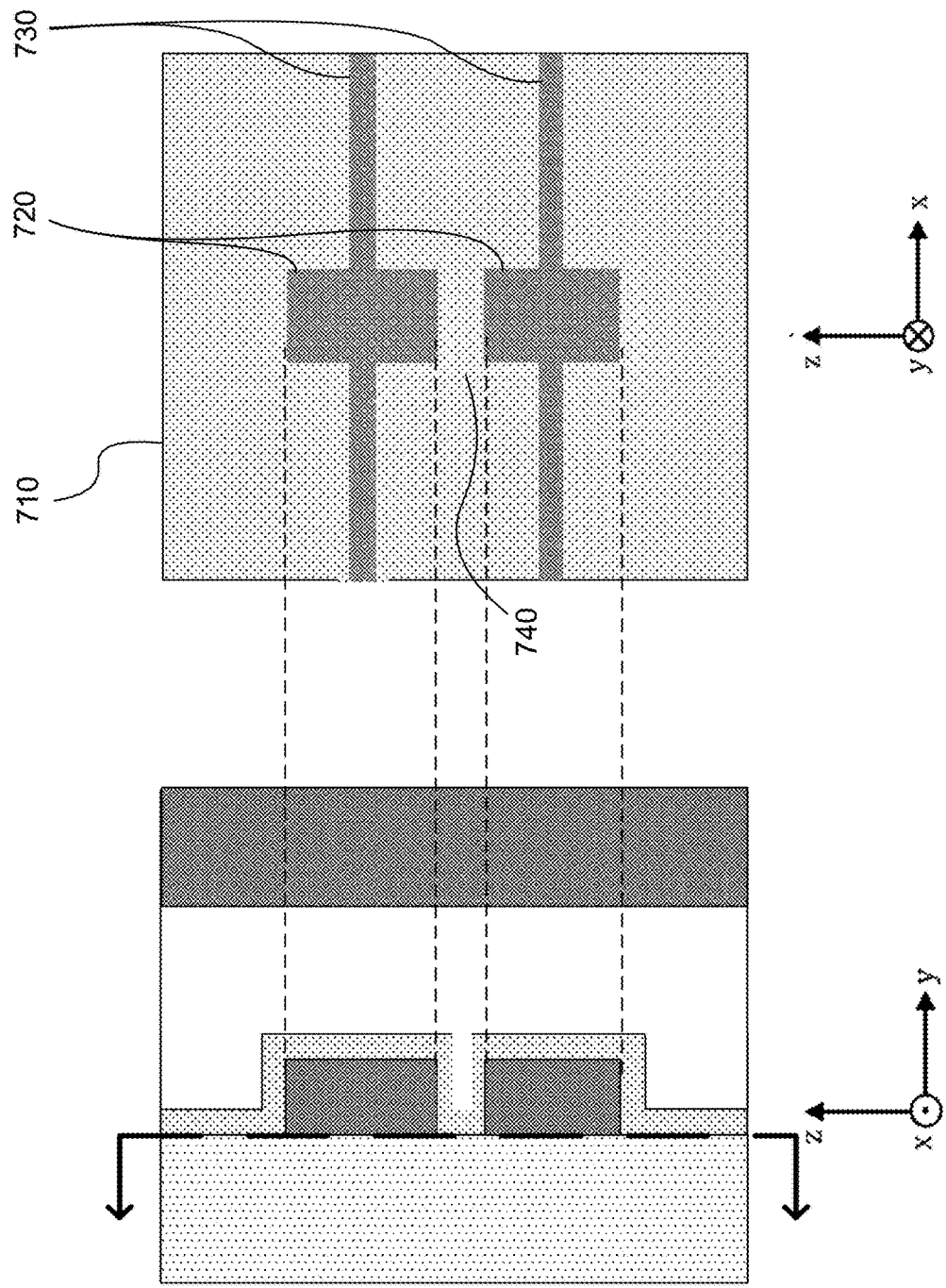
FIG. 7 illustrates an embodiment for a single pixel having a dual-branch antenna.

FIG. 7 illustrates an embodiment of the present invention wherein a pixel 710 comprises a metallic dipole antenna made of two branches 720, each of which is placed across a different connector 730. The gap 740 between the two branches can contain an electric field along the z-axis that can be tuned with the potential applied to each metal. The dimensions of the pixel are such that any effect of the metallic dipole antenna is negligible beyond the boundaries of the pixel. For greater clarity, FIG. 7 illustrates a single antenna having two branches 720, not two independent antennas.

As in the case of a single branch antenna structure, the dimensions of a pixel structure can be selected to be large enough that any effect of the antenna along the xz-plane is negligible beyond the boundaries of a pixel, and small enough for any diffracted side lobe to be negligible.

In addition to the embodiments described above, embodiments of the present invention can comprise at least four different configurations for the layer structure of a pixel, as seen along the x-axis as cross-sections. These configurations are illustrated in FIGS. 8 to 11. Any of these configurations may be used with the layout of FIG. 6 or the layout of FIG. 7.

Figure 8:
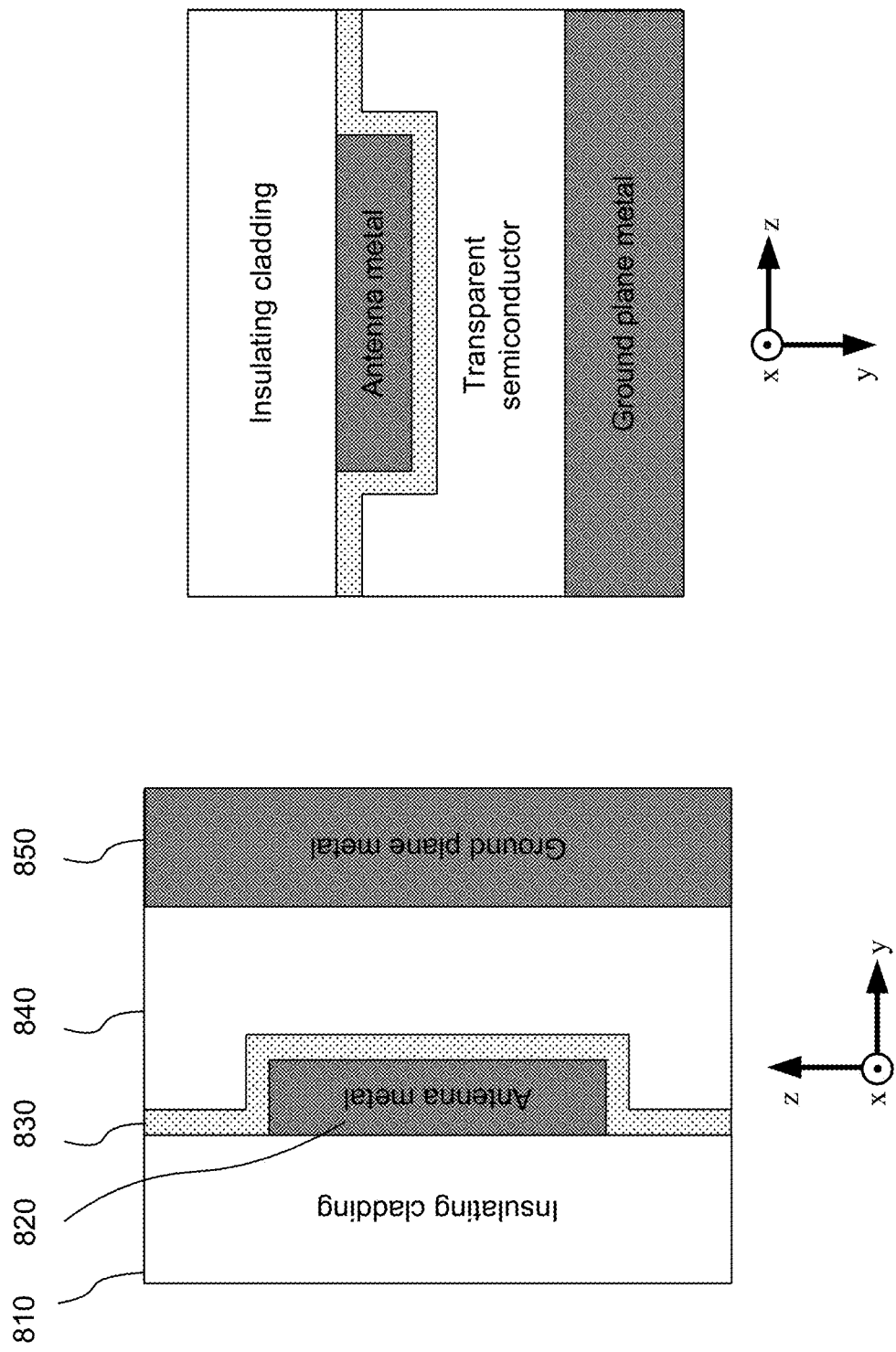
FIG. 8 illustrates the cross-sectional configuration of a single pixel according to one embodiment.

FIG. 8 illustrates an embodiment of the present invention where the cross-section of a pixel comprises five (5) layers, including an insulating cladding 810, an antenna metal 820, a single electrical barrier 830, which embeds the antenna metal 820 into a transparent semiconductor 840, and a ground plane metal 850. The embedding creates beneficial effects as the electrical field across the electrical barrier 830 is not merely at the flat surface of antenna metal 820 (along the positive y direction), but is also at its ends (along the positive and negative x directions). Thus, a strong plasmonic effect is created around multiple faces of antenna metal 820, which increases the strength of the interaction. This is particularly advantageous when combined with the layout of FIG. 7, as there is a strong effect in the gap between the two antenna components, where this gap is embedded within the transparent semiconductor 840.

FIG. 9 illustrates an embodiment of the present invention, wherein a pixel cross-section comprises five (5) layers, including an insulated cladding 910, an antenna metal 920, a single electrical barrier that is not embedding the antenna metal 930, a transparent semiconductor 940, and a ground plane metal 950.

FIG. 10 illustrates an embodiment of the present invention, wherein a pixel cross-section comprises six (6) layers including two (2) electrical barriers, one of which is embedding the antenna metal. The structure comprises: an insulated cladding 1010, an antenna metal 1020, an electrical barrier 1030 that is transparent or sufficiently thin to be transparent, embedding the antenna metal, a transparent semiconductor 1040, a second electrical barrier 1050 that is also transparent or sufficiently thin to be so, and a back metal 1060. In this embodiment, three potentials are applied: a first potential to the antenna 1020, a second potential to the transparent semiconductor 1040 and a third potential to the back metal 1060. The back metal 1060 may be further patterned into antenna structures, analogous to those of antenna 1020 and arranged either parallel or perpendicular to antenna 1020 and a second plasmonic resonance may be created at the interface of transparent semiconductor 1040 and insulator 1050, by means of the potential difference between transparent semiconductor 1040 and back metal 1060. The geometric extent of the first and second plasmonic resonances along the y direction is such that the first and second plasmonic resonances do not substantially interact. In such embodiment, the total phase change experience by an incident optical beam is the sum of phase change from the first plasmonic resonance and the phase change from the second plasmonic resonance.

Figure 11:
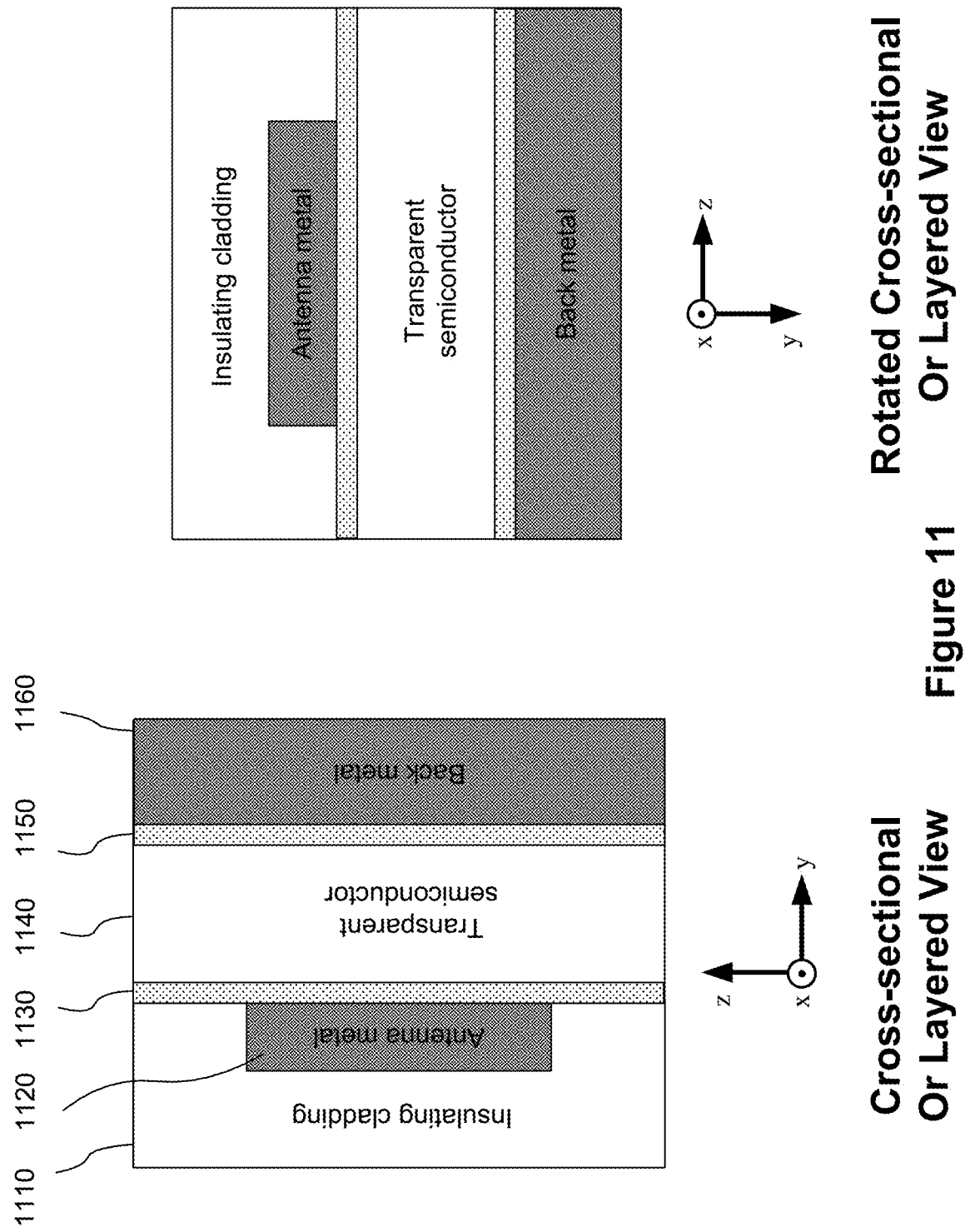
FIG. 11 illustrates the cross-sectional configuration of a single pixel according to another embodiment.

FIG. 11 illustrates an embodiment of the present invention, wherein a pixel cross-section comprises six (6) layers, including two (2) oxide layers, neither of which is embedding the antenna metal. The structure comprises: an insulated cladding 1110, an antenna metal 1120, an electrical barrier 1130 that is transparent or sufficiently thin to be transparent, embedding the antenna metal, a transparent semiconductor 1140, a second electrical barrier 1150 that is also transparent or sufficiently thin to be so, and a ground plane metal 1160. In this embodiment, three potentials are applied: a first potential to the antenna 1120, a second potential to the transparent semiconductor 1140 and a third potential to the back metal 1160. The back metal 1160 may be further patterned into antenna structures, analogous to those of antenna 1120 and arranged either parallel or perpendicular to antenna 1120 and a second plasmonic resonance may be created at the interface of transparent semiconductor 1140 and insulator 1150, by means of the potential difference between transparent semiconductor 1140 and back metal 1160. The geometric extent of the first and second plasmonic resonances along the y direction is such that the first and second plasmonic resonances do not substantially interact. In such embodiment, the total phase change experience by an incident optical beam is the sum of a phase change from the first plasmonic resonance and a phase change from the second plasmonic resonance.

In alternative embodiments, the ground plane metal 560, 850, 950, 1060, 1160 may be sufficiently thin that light can pass through it. In these embodiments, the pixel may be used in transmission, with the cladding 520, 810, 910, 1010, 1110 being either the first or last layer encountered by the incident optical beam depending on whether the optical beam is incident respectively from the negative y or positive y direction. In further alternative embodiments the ground plane metal 560, 850, 950 may be omitted and the semiconductor 550, 840, 940 may perform the function of a ground plane. In these embodiments, the pixel may be used in transmission, with the cladding 520, 810, 910 being either the first or last layer encountered by the incident optical beam depending on whether the optical beam is incident respectively from the negative y or positive y direction.

In embodiments of the present invention, the xz-plane layout of a pixel can comprise either a single-branch antenna 620 or a dual-branch antenna 720, and its y-axis cross-section structure can comprise either of the four (4) cross-sections described in FIGS. 8-11, making for at least 8 embodiments herein specified, each of which having dimensions which can be adjusted in the nanoscopic scale, such as to determine how the structure affects the phase and magnitude of an optical beam having a selected wavelength, in the presence of various electric potentials.

In embodiments of the present invention, when a voltage is applied to the metal antenna, a potential well can be created in the neighbouring few nanometers of the transparent conductor, such as to modulate the density of electrical carriers in the well. These carriers can change the refractive index of the transparent conductor in the well's region.

Figure 12:
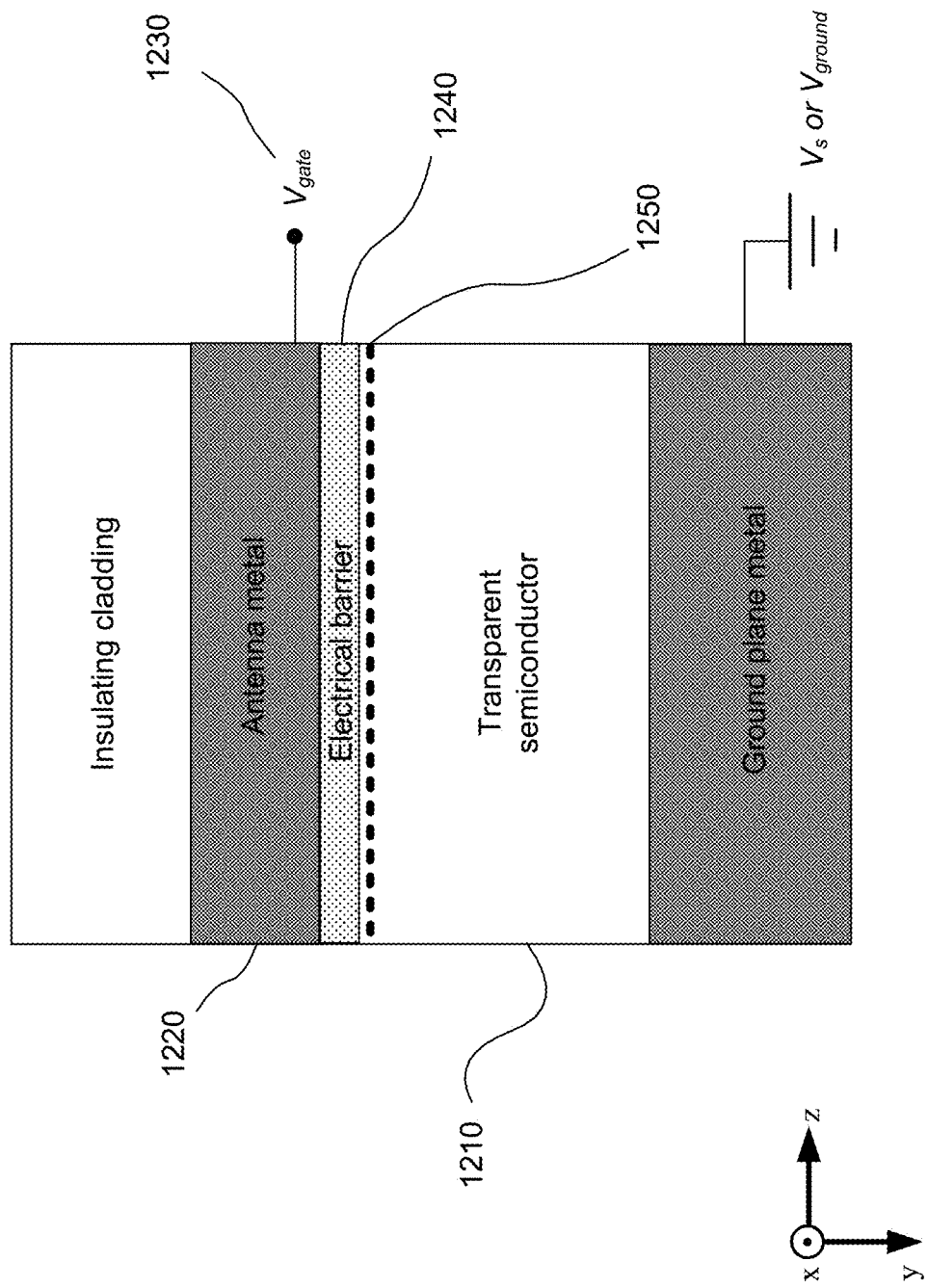
FIG. 12 illustrates the effect of a gate voltage on the semiconductor's carrier density profile.

FIG. 12 illustrates an embodiment of the present invention wherein the transparent semiconductor's 1210 carrier density near the antenna 1220 is modulated by an applied potential, called a gate voltage $V_{gate}$ 1230, across the barrier 1240. The applied potential creates a potential well. The potential well and the modified carrier density are represented by the dashed line 1250. The potential well serves to modify the accumulation of charge carriers at the interface of the transparent semiconductor 1210 and the electrical insulator 1240, by pulling (accumulating)/pushing (depleting) the carriers from/to the body of the transparent semiconductor 1210. When the transparent semiconductor 1210 is n-type, such that the dominant carrier type is electrons, then a positive potential accumulates carriers and a negative potential depletes carriers at said interface. A mix of positive, zero and negative voltages may also be used, depending on the type of the transparent semiconductor 1210, to effect the movement of electrons and/or holes. The type of the transparent semiconductor 1210 (defined as its native density of electrons and holes) may be affected by doping, chemical composition, stoichiometry and temperature. In particular the concentration of oxygen doping may affect the type. It should be understood that these operating principles in and around the electrical barrier 1240 of FIG. 12 are the operating principles in and around each insulator 540, 830, 930, 1030, 1050, 1130, 1150 and their respective adjoining metal and transparent semiconductor.

In embodiments of the present invention, when a beam of optical radiation is incident on the metal antenna, and the frequency of the beam is similar to the plasmonic resonance frequency of the antenna, the interaction can cause excitation of a plasmonic resonance.

In embodiments of the present invention, the plasmonic resonance(s) can be modified by modifying the carrier density in the transparent semiconductor, near the antenna.

In embodiments of the present invention, the thickness of the transparent semiconductor is sufficient to prevent the plasmonic resonance(s) from being perceived by the ground plane metal or back metal.

In embodiments of the present invention, an applied voltage can affect a beam of optical radiation in at least two measurable ways. First, an applied voltage can modify the beam's reflectance or transmittance. Second, an applied voltage can affect a beam's phase shift. The modulation in reflectance or transmittance, and the phase shift, depends on the applied voltage. The modulation in either case can depend on the geometric parameters of the structure.

Figure 13:
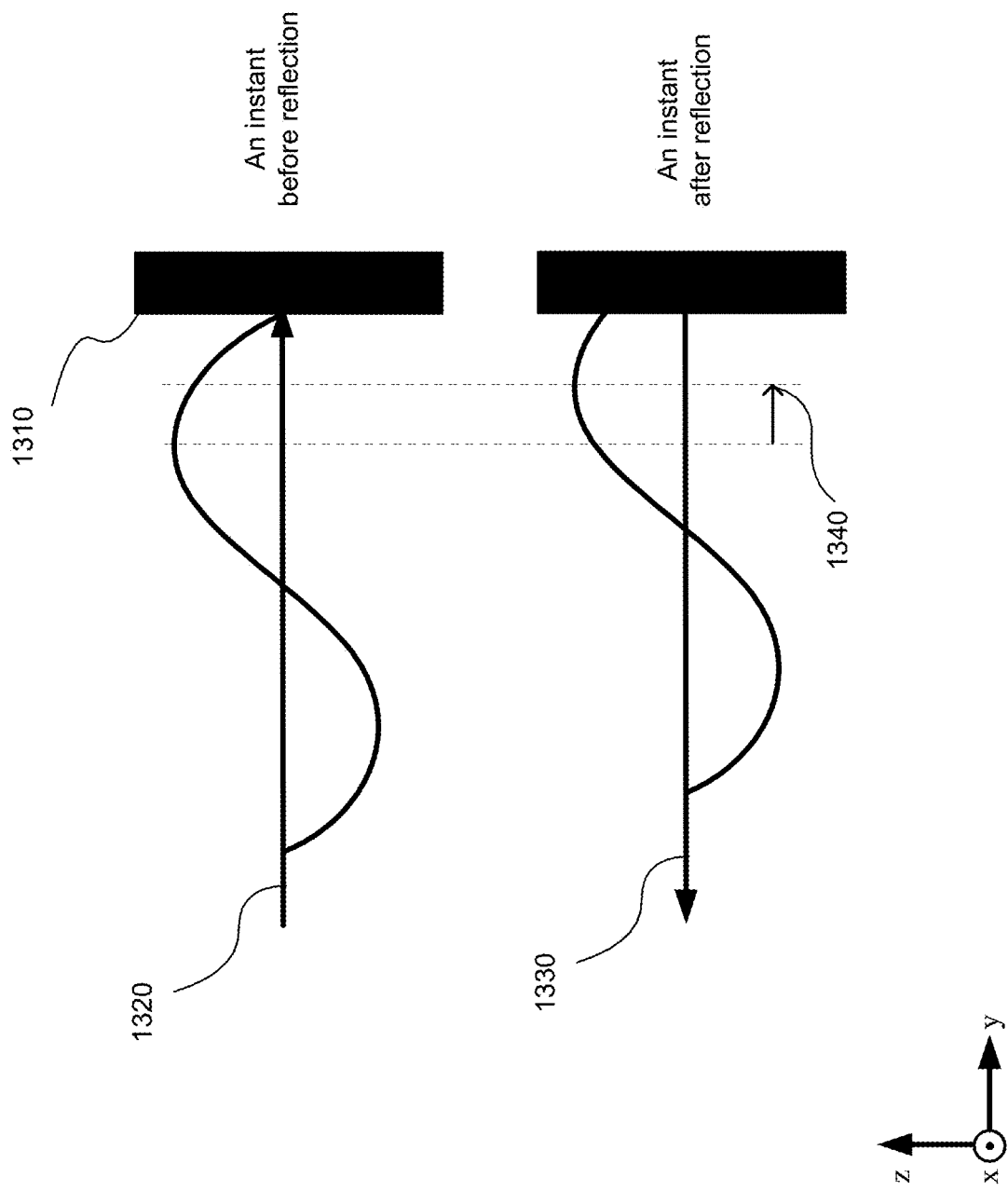
FIG. 13 illustrates an embodiment as it shifts the phase of a reflecting beam by a certain amount.

FIG. 13 illustrates an embodiment of the present invention wherein a single pixel 1310 applies an arbitrary phase shift to an incident beam of optical radiation 1320. The reflected beam 1330 is phase shifted 1340, from a certain number of degrees between −180° and +180°, where a −180° phase shift has the same effect on the beam as a +180° phase shift.

Figure 14A:
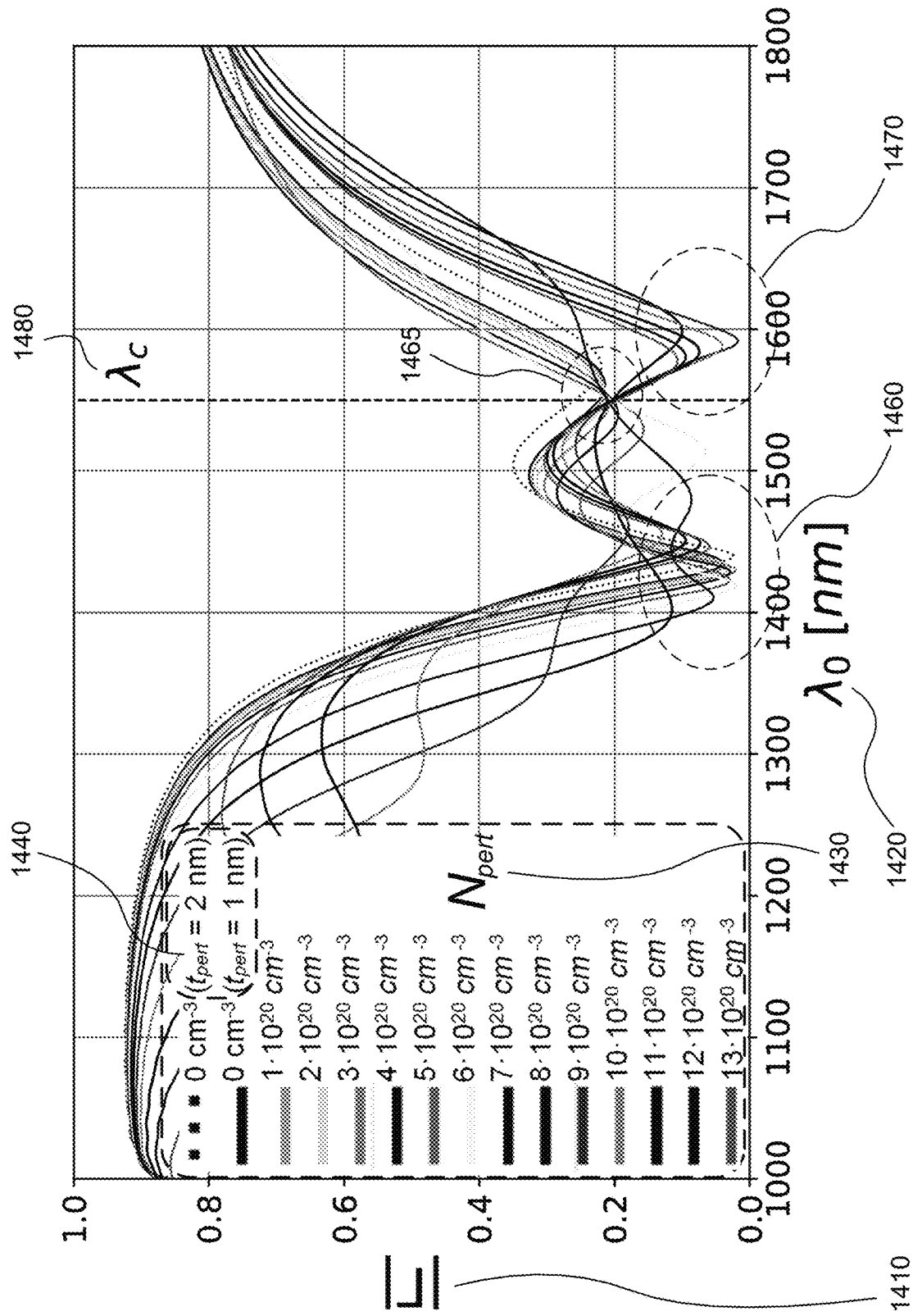
FIG. 14*a* is a graph showing $|\Gamma|$ (the magnitude of the reflectivity) versus $\lambda_0$ (the wavelength of an incident optical beam) for different $N_{pert}$ (carrier densities), or different $t_{pert}$ (thicknesses of a perturbed layer), of a sample embodiment.
Figure 14B:
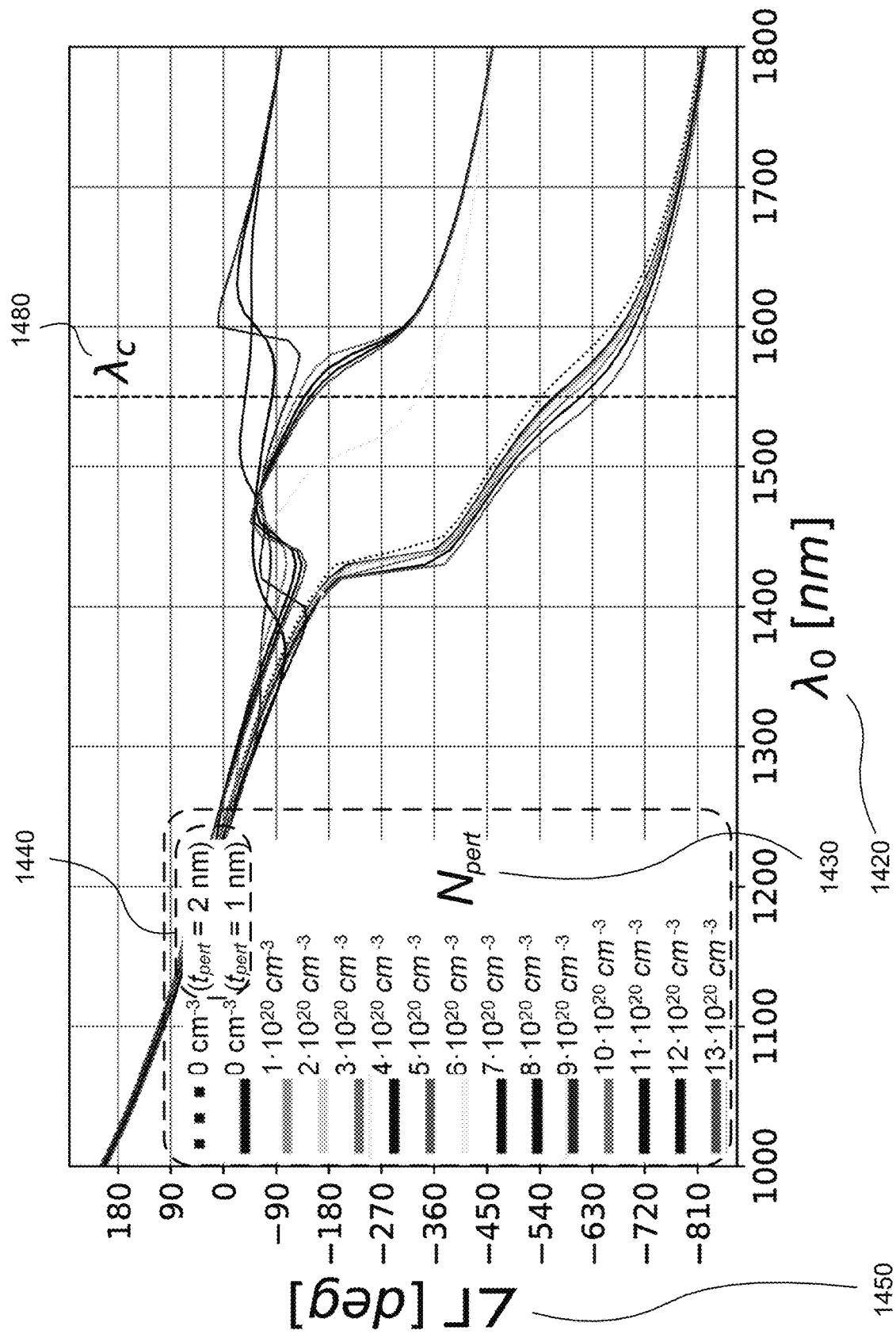
FIG. 14*b* is a graph showing $\angle \Gamma$ (the angle of a reflected optical phase) of the device versus $\lambda_0$, for different $N_{pert}$ and $t_{pert}$ of a sample embodiment.

In embodiments of the present invention, the structural parameters of a pixel can be selected such that for a selected wavelength, a range of applied potentials can shift the beam's phase by nearly any amount from −180 degrees to 180 degrees, without significantly affecting the transmittance or reflectance. This is illustrated in FIG. 14a and FIG. 14b, which show optical spectra for a device consistent with the structure of FIG. 7, having a dipole antenna with two branches. FIG. 14a shows |Γ| (the magnitude of gamma, the reflectivity) 1410 versus $\lambda_0$ (lambda zero, the wavelength of an incident optical beam) 1420 for different $N_{pert}$ (carrier densities in a perturbed layer) 1430, and different $t_{pert}$ (thicknesses of a perturbed layer) 1440. FIG. 14b shows ∠Γ (the reflected optical phase) 1450 of the device versus $\lambda_0$ 1420, for different $N_{pert}$ 1430 and $t_{pert}$ 1440. In such a structure, the electrical connectors in a pixel may interact with the antenna such that the plasmonic resonance of the antenna is split into two non-degenerate (different wavelength) resonances. The first resonance is supported by the antenna and tuned by an electro-optical interaction primarily in the gap 740 of the nanoantenna, whereas the secondary resonance is supported primarily by the connector components 730. Advantageously, the interplay between this pair of resonances is such that at an operating wavelength, denoted by $\lambda_c$ (lambda c) 1480, a change in carrier density 1430 in the transparent semiconductor region immediately adjacent the dipole antenna induces a change in optical phase, with essentially no change in optical magnitude 1410. The operating wavelength $\lambda_c$ 1480 lies between the wavelengths of the first and second resonances. For example, in FIG. 14a, there is a pair of resonances at around 1430 nm 1460, and 1600 nm 1470 respectively. There is an optimum operating wavelength $\lambda_c$) 1480 at around 1550 nm wherein the magnitude of the reflectivity 1410 is constant 1465 while the optical phase 1450, dependent on carrier density 1430, is changed. This is advantageous for the efficient operation of a phased array, as variations in optical magnitude may induce distortion and loss in the output optical beam. FIG. 14a and FIG. 14b result from materials and geometric parameters that are in accordance with this embodiment.

FIG. 15 illustrates an embodiment of the present invention wherein geometric parameters of a pixel have been selected such that for a range of applied voltage potentials, the phase of a 1550 nm beam can be shifted by nearly any amount between −180 and 180, while the reflectance undergoes a change of only 9%. The parameters of this embodiment are:

Thickness of the antenna metal 1510: 50 nm
Thickness of the electrical barrier layer 1520: 5 nm
Thickness of the transparent semiconductor 1530: 44 nm
Length of the antenna metal 1540: 194 nm
Width of the antenna metal 1550: 50 nm
Width of the antenna metal connector 1560: 50 nm
Distance from one antenna to another along a connector metal (pitch) 1570: 500 nm
Position along an antenna branch where a connector metal crosses it 1580: 58 nm
Gap between the two antenna metals in the case of a dipole antenna 1590: 30 nm In embodiments of the present invention, pixels can be electrically connected to each other through their connector 630 or 730 to form rows, and rows of similar pixels can be placed adjacent to each other such as to form an array.

Figure 16:
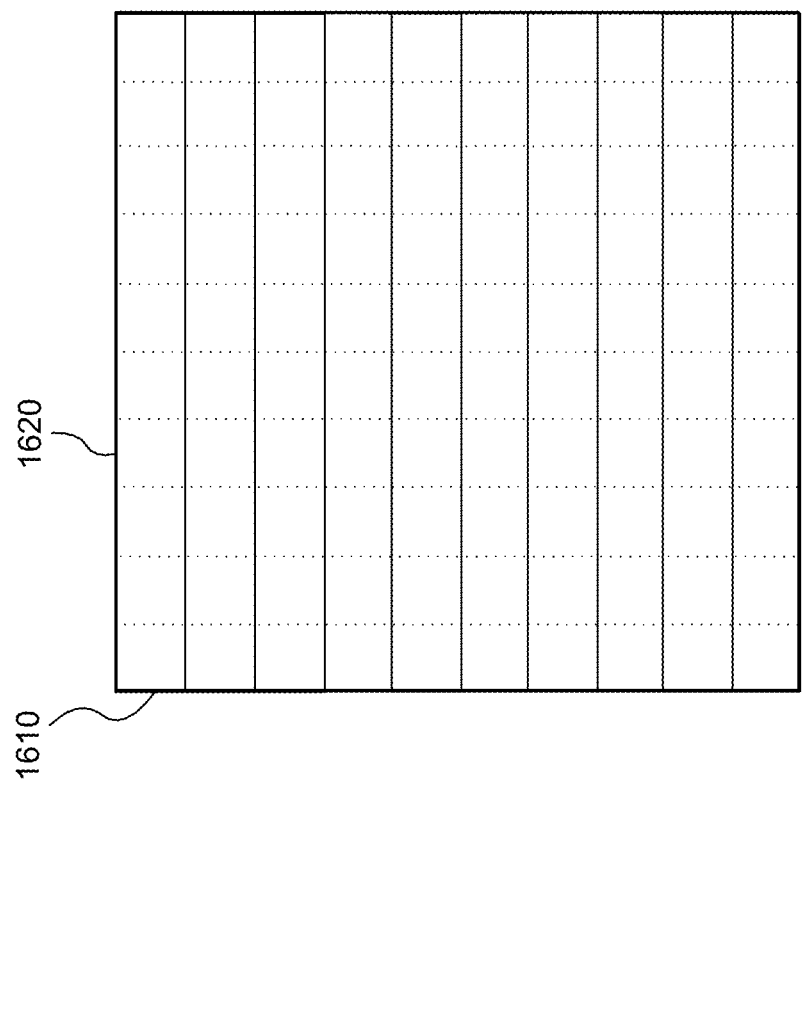
FIG. 16 illustrates an embodiment wherein pixels are laid out in independent rows to form an array.

FIG. 16 illustrates an embodiment of the present invention wherein rows of similar pixels 1610 along the x-axis are placed adjacent to each other along the z-axis 1620, such as to form an array in the xz-plane.

In embodiments of the present invention, a different voltage potential can be applied to each row of similar pixels, such that each row applies a different phase shift to its the part of the incident beam. The voltage potential applied to each row of pixels can be selected such that the phase shift applied by one row is different from the phase shift applied by a neighbouring row, and the difference in phase shifts applied by any two neighbouring rows is the same for any two neighbouring rows.

In some embodiments that utilize the dual-branch antenna 720 as illustrated in FIG. 7, the two connector components 730 may be electrically connected or shorted to each other allowing the two branches to be controlled or electrically tuned in the same manner. In other embodiments, the two branches may be controlled independently of each other.

Figure 17:
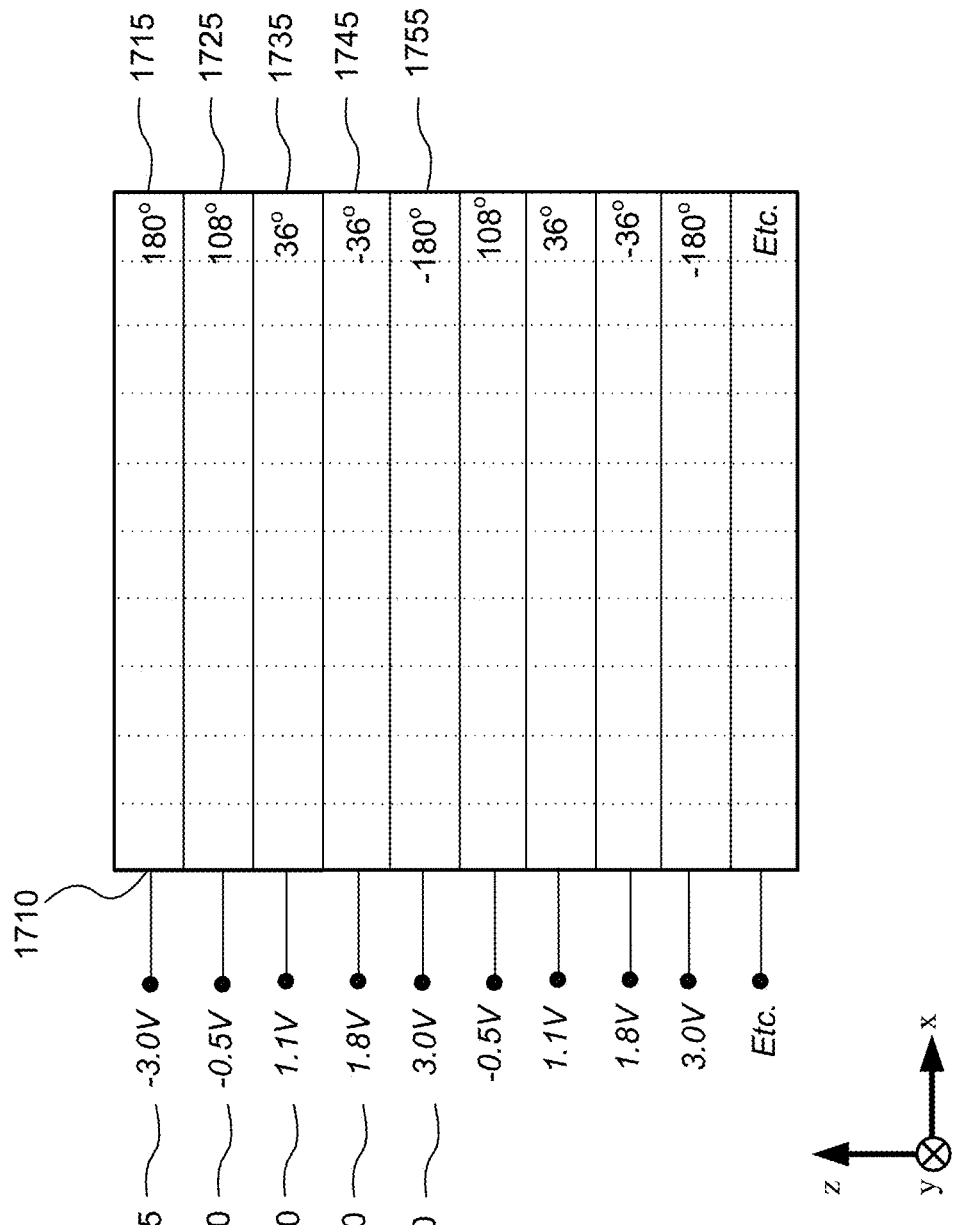
FIG. 17 illustrates an array wherein a pattern of applied phase shifts is applied to steer a beam.

FIG. 17 illustrates an embodiment of the present invention, wherein the difference in phase shifts applied by any two neighbouring rows of connected pixels is always 72°:

A gate voltage of −3.0 V 1705 can be applied to the first row of connected pixels 1610, such as to shift the phase of a beam on that row by 180° 1715.

A gate voltage of −0.5 V 1720 can be applied to the second row of connected pixels such as to shift the phase of a beam on that row by 180°−72°=108° 1725.

A gate voltage of −1.1 V 1730 can be applied to the third row of connected pixels such as to shift the phase of a beam on that row by 108°−72°=36° 1735.

A gate voltage of −1.8 V 1740 can be applied to the fourth row of connected pixels such as to shift the phase of a beam on that row by 36°−72°=−36° 1745.

A gate voltage of 3.0 V 1750 can be applied to the fifth row of connected pixels such as to shift the phase of a beam on that row by −36°−72°=−180° 1755.

Subsequent gate voltages along the z-axis can be applied in a repeating pattern such as to cover the entire array of pixel rows.

In embodiments of the present invention, when a repeating pattern of phase shifts are applied by rows of pixels along the z-axis such as in FIG. 17, the reflected or transmitted beam is steered along the yz-plane.

In embodiments of the present invention, the pattern of applied voltages, along with the corresponding phase shifts, can be modulated such as to steer the incident optical beam in a range of outgoing directions.

In embodiments of the present invention, layers can be added such as such as to duplicate the structure and allow steering in the xy-plane, as well as steering in the xz-plane, using an independent applied voltage pattern.

Embodiments of the invention are directed towards a pixel that includes a transparent electrical insulator (which may be a substrate or may be air), a first electrical conductor disposed on the transparent electrical insulator, the first electrical conductor comprising an antenna component and a connector component, an electrical insulator disposed on the first electrical conductor, a transparent semiconductor disposed on the electrical insulator, and a second electrical conductor disposed on the transparent semiconductor. The transparent semiconductor is sufficiently thick to prevent plasmonic resonance from occurring at an interface between the transparent semiconductor and the second electrical conductor, upon excitation of a plasmonic resonance at the electrical insulator and its interfaces to the first electrical conductor and the transparent semiconductor.

In further embodiments, the transparent semiconductor is sufficiently thick to prevent any joint plasmonic resonance from occurring between two sets of interfaces, a first set of interfaces between the first electrical conductor, the electrical insulator and the transparent semiconductor; and a second set of interfaces between the transparent semiconductor and the second electrical conductor.

In further embodiments, the first electrical conductor, the electrical insulator and the transparent semiconductor can support a plasmonic resonance upon excitation by an incident optical beam.

In further embodiments, the first electrical conductor is partially or wholly embedded in the electrical insulator.

In further embodiments, the pixel includes a second electrical insulator between the transparent semiconductor and the second electrical conductor.

In further embodiments, the antenna component does not extend to the edge of the pixel and the electrical connector component intersects the antenna component and extends to an edge of the pixel to allow a connection external to the pixel.

In further embodiments, the antenna component includes two lines shorter than the length of the pixel separated by a gap, and short enough not to overlap any part of the neighbouring intersection. Each of the two lines is intersected by corresponding connector components that extend to the edge of the pixel to allow connections external to the pixel. The connector components extending on either side of an antenna may be shorted or connected to each other.

In further embodiments, the dimensions of the antenna component are selected for the pixel to operate with an optical beam having a wavelength in the visible and infrared range.

In further embodiments, the dimensions of the antenna component are selected to prevent significant interaction with an adjacent pixel.

In further embodiments, the transparent electrical insulator serves as a cladding for the remaining structure.

In further embodiments, the antenna component serves as an antenna for optical radiation, as well as a variable source of constant electrical potential.

In further embodiments, the electrical insulator is sufficiently thin to allow electrical fields from the antenna component to be perceived by the transparent semiconductor.

In further embodiments, the electrical insulator is sufficiently thin to allow a change in electric fields from the antenna component to cause a change in carrier density profile in the transparent semiconductor.

In further embodiments, the transparent semiconductor has a carrier density profile that is affected by fields of the antenna component, the fields comprising static fields and time-varying fields.

In further embodiments, the second electrical conductor serves as a ground plane.

In further embodiments, the antenna component, the electrical insulator, and the transparent semiconductor, sustain a plasmonic resonance when a beam of optical radiation is incident upon the structure.

In further embodiments, the resonance frequency of the plasmonic resonance can be altered by applying an electrical potential between the antenna component and the second electric conductor.

In further embodiments, a phase of an incident beam of optical radiation is shifted as it is transmitted or reflected at the resonance layers, the shift being affected by an electrical potential applied between the antenna component and the second electric conductor.

In further embodiments, a phase shift of a reflected or transmitted beam of optical radiation is affected by an electrical potential applied between the antenna component and the second electric conductor.

In further embodiments, the resonance of the structure is split into a pair of resonances, wherein a first resonance is induced by an electrical-optical interaction primarily in the gap between the two lines of the antenna, and a secondary resonance can be induced primarily by an electrical-optical interaction between the connector components.

In further embodiments, the resonance of the structure is split into a pair of resonances, having different wavelengths, by a degeneracy-breaking interaction between the antenna and the connectors, wherein a first resonance is induced by an electrical-optical interaction primarily in the gap between the two lines of the antenna, and a secondary resonance can be induced primarily by an electrical-optical interaction between the connector components.

In further embodiments, a pixel can have a first resonance induced by an electro-optical interaction primarily in the gap between the two lines of the antenna, and have a secondary resonance induced by an electrical-optical interaction between the connector components.

In further embodiments, the first and second resonances can be at different wavelengths, and the magnitude of reflectance or transmittance of a beam of optical radiation having a wavelength between the first and second resonances is not significantly affected by an electrical potential applied between the antenna component and the second electric conductor.

In further embodiments, the reflectance or transmittance of a beam of optical radiation is not significantly affected by an electrical potential applied between the antenna component and the second electric conductor.

In further embodiments, the resonance of the structure is split into a pair of resonances, having different wavelengths, by a degeneracy-breaking interaction between the antenna and the connectors.

In further embodiments, the relative strength, wavelength and spectral width of the resonances may be such that there is an optical spectral region wherein the magnitude of the optical reflection is essentially constant.

In further embodiments, the relative strength, wavelength and spectral width of the resonances may be such that the magnitude of reflectance or transmittance of a beam of optical radiation having a wavelength between the first and second resonances is not significantly affected by an electrical potential applied between the antenna component and the second electric conductor.

In further embodiments, the relative strength, wavelength and spectral width of the resonances may be such that there is an optical spectral region wherein an electrical potential applied between the antenna component and the second electric conductor significantly affects the phase of reflectance or transmittance of a beam of optical radiation but not the magnitude of reflectance or transmittance of a beam of optical radiation.

In further embodiments, the second electrical conductor is sufficiently thin to be transparent to a range of optical wavelengths.

In further embodiments, the second electrical conductor is omitted and the transparent semiconductor serves as a ground plane.

In further embodiments, the thicknesses, widths and lengths of the materials are selected to result in a reflectance spectrum in which the reflectance magnitude for at least one wavelength of optical radiation, is similar for any carrier density of the transparent semiconductor, in a range of carrier densities corresponding to an at least 90-degree-wide range of phase shifts, for the at least one wavelength of optical radiation.

Other embodiments are directed towards a pixel array including a plurality of pixels arranged in a plurality of rows. Each of the plurality of pixels in each of the plurality of rows is connected in series. Each of the plurality of pixels includes a transparent electrical insulator, a first electrical conductor disposed on the transparent electrical insulator, the first electrical conductor comprising an antenna component and a connector component, an electrical insulator disposed on the first electrical conductor, a transparent semiconductor disposed on the electrical insulator, and a second electrical conductor disposed on the transparent semiconductor. The transparent semiconductor is sufficiently thick to prevent plasmonic resonance that is primarily located in the vicinity of the electrical insulator from having a significant strength at an interface between the transparent semiconductor and the second electrical conductor.

In further embodiments, each of the plurality of rows is independent of each other. Each of the plurality of rows is capable of having a different potential applied to allow the application of electric potential patterns to steer a beam of optical radiation incident on the array without significantly altering its amplitude profile.

In further embodiments, the dimensions of the antenna component are selected to prevent significant diffraction or side lobes from an interacting beam of optical radiation.

Unless defined otherwise, all technical and scientific terms used herein have the same meaning as commonly understood by one of ordinary skill in the art to which this invention belongs.

We claim:

1. A pixel comprising:
   a transparent electrical insulator;
   a first electrical conductor disposed on the transparent electrical insulator, the first electrical conductor comprising an antenna component and a connector component;
   an electrical insulator disposed on the first electrical conductor;
   a transparent semiconductor disposed on the electrical insulator; and
   a second electrical conductor disposed on the transparent semiconductor, the second electrical conductor defining a ground plane;
   wherein the transparent semiconductor is sufficiently thick to prevent plasmonic resonance from occurring at an interface between the transparent semiconductor and the second electrical conductor; and
   wherein the electrical insulator is sufficiently thin to allow a change in electrical fields from the antenna component to cause a change in carrier density profile in the transparent semiconductor.

2. The pixel of claim 1 wherein the transparent semiconductor is sufficiently thick to prevent joint plasmonic resonance from occurring between two sets of interfaces:
   a first set of interfaces between the first electrical conductor, the electrical insulator and the transparent semiconductor; and
   a second set of interfaces between the transparent semiconductor and the second electrical conductor.

3. The pixel of claim 1 wherein the first electrical conductor, the electrical insulator and the transparent semiconductor support a plasmonic resonance upon excitation by an incident optical beam.

4. The pixel of claim 1 wherein the first electrical conductor is at least partially embedded in the electrical insulator.

5. The pixel of claim 1 wherein the electrical insulator is a first electrical insulator, the pixel further comprising a second electrical insulator between the transparent semiconductor and the second electrical conductor.

6. The pixel of claim 1 wherein the antenna component does not extend to the edge of the pixel and the connector component intersects the antenna component and extends to an edge of the pixel to allow a connection external to the pixel.

7. The pixel of claim 1 wherein the antenna component comprises two lines separated by a gap and in total shorter than the length of the pixel, and short enough not to overlap any part of the neighbouring intersection, each of the two lines intersected by corresponding connector components that extend to the edge of the pixel to allow connections external to the pixel.

8. The pixel of claim 1 wherein the antenna component serves as an antenna for optical radiation, as well as a variable source of constant electrical potential.

9. The pixel of claim 1 wherein the antenna component, the electrical insulator, and the transparent semiconductor, sustain a plasmonic or electrical resonance when a beam of optical radiation is incident upon the structure.

10. The pixel of claim 9 wherein the resonance frequency of the plasmonic resonance can be altered by applying an electrical potential between the antenna component and the second electric conductor.

11. The pixel of claim 1 wherein a phase of an incident beam of optical radiation is shifted as it is transmitted or reflected at the resonance layers, the shift being affected by an electrical potential applied between the antenna component and the second electric conductor.

12. The pixel of claim 7 having a first resonance induced by an electrical-optical interaction primarily in the gap between the two lines of the antenna, and having a second resonance induced by an electrical-optical interaction between the connector components.

13. The pixel of claim 12 wherein the first and second resonances are at different wavelengths, and the magnitude of reflectance or transmittance of a beam of optical radiation having a wavelength between the first and second resonances is not significantly affected by an electrical potential applied between the antenna component and the second electric conductor.

14. The pixel of claim 1 wherein the second electrical conductor is sufficiently thin to be transparent to a range of optical wavelengths.

15. A pixel array comprising:
   a plurality of pixels arranged in a plurality of rows, each of the plurality of pixels in each of the plurality of rows connected in series;
   each of the plurality of pixels comprising:
   a transparent electrical insulator;

a first electrical conductor disposed on the transparent electrical insulator, the first electrical conductor comprising an antenna component and a connector component;

an electrical insulator disposed on the first electrical conductor;

a transparent semiconductor disposed on the electrical insulator; and a second electrical conductor disposed on the transparent semiconductor, the second electrical conductor defining a ground plane;

wherein the transparent semiconductor is sufficiently thick to prevent plasmonic resonance from occurring at an interface between the transparent semiconductor and the second electrical conductor; and wherein the electrical insulator is sufficiently thin to allow a change in electrical fields from the antenna component to cause a change in carrier density profile in the transparent semiconductor.

16. The pixel array of claim 15 wherein each of the plurality of rows is independent of each other, each of the plurality of rows capable of having a different potential applied to allow the application of potential patterns to steer a beam of optical radiation incident on the array without significantly altering its amplitude profile.

17. The pixel array of claim 15 wherein dimensions of the pixels are selected to prevent significant diffraction or side lobes from an interacting beam of optical radiation.

* * * * *